US011636107B2

(12) United States Patent
Shimizu et al.

(10) Patent No.: US 11,636,107 B2
(45) Date of Patent: *Apr. 25, 2023

(54) DATABASE MANAGEMENT SYSTEM, COMPUTER, AND DATABASE MANAGEMENT METHOD

(71) Applicants: HITACHI, LTD., Tokyo (JP); The University of Tokyo, Tokyo (JP)

(72) Inventors: Akira Shimizu, Tokyo (JP); Seisuke Tokuda, Tokyo (JP); Michiko Yoshida, Tokyo (JP); Kazuhiko Mogi, Tokyo (JP); Shinji Fujiwara, Tokyo (JP); Nobuo Kawamura, Tokyo (JP); Masaru Kitsuregawa, Tokyo (JP); Kazuo Goda, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 756 days.

This patent is subject to a terminal disclaimer.

(21) Appl. No.: 16/531,256

(22) Filed: Aug. 5, 2019

(65) Prior Publication Data

US 2019/0354527 A1 Nov. 21, 2019

Related U.S. Application Data

(63) Continuation of application No. 14/397,076, filed as application No. PCT/JP2012/061436 on Apr. 27, 2012, now Pat. No. 10,417,227.

(51) Int. Cl.
*G06F 16/2453* (2019.01)
*G06F 16/2455* (2019.01)
*G06F 9/48* (2006.01)

(52) U.S. Cl.
CPC ...... *G06F 16/24542* (2019.01); *G06F 9/4843* (2013.01); *G06F 16/2455* (2019.01); *G06F 16/24532* (2019.01)

(58) Field of Classification Search
CPC .......... G06F 16/24542; G06F 16/2455; G06F 16/24532
See application file for complete search history.

(56) References Cited

U.S. PATENT DOCUMENTS 5,742,806 A * 4/1998 Reiner .............. G06F 16/24532
711/216
5,893,912 A * 4/1999 Freund .................... G06F 9/463
707/999.103

(Continued)

FOREIGN PATENT DOCUMENTS

JP 2007-034414 A 2/2007
JP 2007-065978 A 3/2007

(Continued)

OTHER PUBLICATIONS

Idei et al., "Query Plan Riyo Sakiyomi Gijutsu ni Okeru Taju Shori Jikkoji no Seino Model Kento", The Institute of Electronics, Information and Communication Engineers Dai 18 Kai Data Kogaku Workshop Ronbunshu, Jun. 1, 2007.

(Continued)

*Primary Examiner* — Usmaan Saeed
*Assistant Examiner* — Jessica N Le
(74) *Attorney, Agent, or Firm* — Mattingly & Malur, PC

(57) ABSTRACT

A database management system (DBMS) generates a query execution plan including information representing one or more database (DB) operations necessary for executing a query and executes the query based on the query execution plan. In the execution of the query, the DBMS dynamically generates a task for executing a DB operation and executes (Continued)

the dynamically generated task. The DBMS executes a task in a plurality of threads executed by a processor core.

15 Claims, 29 Drawing Sheets

(56) References Cited

U.S. PATENT DOCUMENTS

| | | | |
|---|---|---|---|
| 6,205,441 B1* | 3/2001 | Al-omari | G06F 16/24537 |
| | | | 707/999.005 |
| 6,678,672 B1 | 1/2004 | Ramasamy et al. | |
| 7,383,389 B1 | 6/2008 | Bumbulis | |
| 8,417,689 B1* | 4/2013 | Waas | G06F 9/54 |
| | | | 707/718 |
| 9,141,173 B2* | 9/2015 | Bose | G06F 1/3246 |
| 2004/0039729 A1 | 2/2004 | Boger et al. | |
| 2006/0218123 A1 | 9/2006 | Chowdhuri et al. | |
| 2006/0294058 A1 | 12/2006 | Zabback et al. | |
| 2007/0022100 A1 | 1/2007 | Kitsuregawa et al. | |
| 2007/0245130 A1 | 10/2007 | Stuttard et al. | |
| 2008/0052266 A1 | 2/2008 | Goldstein et al. | |
| 2008/0148271 A1 | 6/2008 | Leckie | |
| 2011/0022584 A1 | 1/2011 | Kitsuregawa et al. | |
| 2012/0066683 A1 | 3/2012 | Srinath | |
| 2012/0117075 A1 | 5/2012 | Gokulakannan | |
| 2012/0131595 A1 | 5/2012 | Kim et al. | |
| 2012/0310921 A1 | 12/2012 | Egan et al. | |
| 2013/0144867 A1 | 6/2013 | Tanaka et al. | |
| 2013/0159285 A1* | 6/2013 | Dees | G06F 16/24542 |
| | | | 707/718 |
| 2013/0173996 A1 | 7/2013 | Anderson et al. | |
| 2014/0223141 A1 | 8/2014 | Combs et al. | |
| 2015/0169591 A1* | 6/2015 | Yoshida | G06F 16/24569 |
| | | | 707/769 |

FOREIGN PATENT DOCUMENTS

| | | |
|---|---|---|
| JP | 2011-159107 A | 8/2011 |
| WO | 2012/026140 A1 | 3/2012 |

OTHER PUBLICATIONS

Extended European Search Report received in corresponding European Application No. 12875146.8 dated Dec. 11, 2015.
Harizopoulos, S. et al., "QPipe: A Simultaneously Pipelined Relational Query Engine", Sigmod 2005: Proceedings of the ACM Sigmod International Conference on Management of Data, Association for Computing Machinery, Jun. 2005, pp. 383-394.
Pandis, I. et al., "Data-Oriented Transaction Execution", International Conference on Very Large Data Bases Proceedings of the VLDB Endowment, Sep. 2010, vol. 3, pp. 928-939.
Pankratius, V. et al., "Moving Database Systems to Multicore: An Auto-Turning Approach", 2011 International Conference on Parallel Processing, 2011, pp. 582-591.
Japanese Office Action received in corresponding Japanese Application No. 2015-235613 dated Oct. 25, 2016.
Hirayama, O., "Let's Understand Internal Behavior, Learning SQL by Seeing Pictures, a Deep Layer of a Server", DB Magazine, Dec. 1, 2007, pp. 112-121, vol. 17, No. 3, Japan.
Communication Pursuant to Article 94(3) EPC received in corresponding European Application No. 12 875 146.8 dated Feb. 22, 2019.
Communication Pursuant to Article 94(3) EPC received in corresponding European Application No. 12 875 146.8 dated Jul. 7, 2022.

* cited by examiner

Fig. 4

Table definition, index definition

Part table:
CREATE TABLE PART ( c1 INTEGER, c2 INTEGER )
Part index:
CREATE INDEX IDX_PART ON PART ( c1 )
Lineitem table:
CREATE TABLE LINEITEM ( c3 INTEGER, c4 CHAR(10) )
Lineitem index:
CREATE INDEX IDX_LINEITEM ON LINEITEM ( c3 )

Fig. 5

Logical image of Part table

| c1 | c2 |
|---|---|
| 10 | id11 |
| ⋮ | |
| 130 | id131 |
| 130 | id132 |
| 130 | id133 |
| ⋮ | |
| 300 | id301 |

Fig. 6

Logical image of Lineitem table

| c3 | c4 |
|---|---|
| id11 | A |
| ⋮ | |
| id131 | D |
| id131 | E |
| id132 | A |
| id132 | B |
| id132 | C |
| id133 | F |
| id133 | G |
| ⋮ | |
| id301 | Z |

Query

```
SELECT    c1, c4
FROM      part, lineitem
WHERE     c1 = 130   and c2 = c3
```

Fig. 12

| | | 74A |
|---|---|---|
| 74a | Search condition | 115 ≦ key ≦ 195 |
| 74b | Page number | 3 |
| 74c | Slot number | 1 |

Fig. 13

| | | 74B |
|---|---|---|
| 74d | Search condition | 115 ≦ key ≦ 195 |
| 74e | Page number | 8 |
| 74f | Slot number | 2 |
| 74g | Processing row ID number | 1 |

Fig. 14

| | | 74C |
|---|---|---|
| 74h | Page number | 100 |
| 74i | Slot number | 2 |

DATABASE MANAGEMENT SYSTEM, COMPUTER, AND DATABASE MANAGEMENT METHOD

TECHNICAL FIELD

The present invention relates to a data management technique.

BACKGROUND ART

In enterprise activities, utilization of a large amount of generated business data is indispensable. Therefore, a system that analyzes a database (hereinafter, "DB") that stores a large amount of business data has already been devised.

In this analysis processing, a database management system (hereinafter, "DBMS") receives a query and issues a data read request to a storage device that stores a DB.

As a technique of reducing latency for a data read in a processing for one query, a technique disclosed in PTL 1 is known. According to PTL 1, a DBMS generates a plan (hereinafter, "query execution plan") which is a combination of a plurality of database operations (called DB operations or processing steps) necessary for executing a query, dynamically generates tasks for executing the processing steps, and concurrently executes the tasks to multiplex a data read request. For implementation of the task, according to PTL 1, any execution environment such as a process or thread managed by an OS or a pseudo process or pseudo thread implemented by an application or middleware can be used.

CITATION LIST

Patent Literature

[PTL 1] Japanese Patent Application Publication No. 2007-34414

SUMMARY OF INVENTION

Technical Problem

In the case where the number of data stored in a DB is several tens of thousands, there are cases where several tens of thousands of tasks are generated with respect to a processing for one query. When a task in such a case is implemented with a thread (or process), several tens of thousands of threads are generated. Since a thread is executed on an arbitrary processor core in a computer having a plurality of processor cores, an arbitrary processor core updates a management structure of a thread. Therefore, the overhead for management of thread execution increases. As a result, there is a problem that the execution time of the query is increased.

When a task is implemented with a pseudo thread (or pseudo process), the task is supposed to be implemented with one thread (or process). Since a management structure of a pseudo thread is updated by only one thread even if several tens of thousands of pseudo threads are generated, the management overhead is small. However, in the case where a computer has a plurality of processor cores, only one processor core is used, since there is one thread. Therefore, since only one processor core can be used in the case where many processing operations by a processor core are necessary in order to execute a processing step, there is a problem that the execution time of a query is increased.

Thus, an object of the present invention is to use a plurality of processor cores for a DBMS and reduce the management overhead of a thread.

Solution to Problem

The DBMS is realized by a computer including a processor core and manages a DB. The DBMS includes a query reception unit that receives a query to the DB, a query execution plan generation unit that generates a query execution plan including information representing a processing step necessary for executing the received query and an execution procedure of the processing step, and a query execution unit that executes the received query based on the generated query execution plan and, in an execution of the received query, dynamically generates a task for executing a processing step to execute the dynamically generated task.

The query execution unit, in an execution of the received query, executes a task in a plurality of threads executed by a processor core and executes a plurality of tasks in one thread executed by the processor core. For example, in the execution of a query, the query execution unit may dynamically generate a task for executing a database operation and execute the dynamically generated task. For example, in the execution of a query, the query execution unit may perform (a) generating a task for executing a database operation, (b) executing the generated task to issue a data read request to a database in order to read data necessary in the database operation corresponding to the task, (c) in the case of executing an (N+1)th database operation based on an execution result of an N-th database operation (N is an integer of 1 or greater) corresponding to the task executed in (b) described above, newly generating a task based on the execution result, and (d) performing of (b) and (c) for the newly generated task. In the case where two or more ready tasks exist in (b) and (d), at least two tasks out of the two or more tasks may be executed concurrently.

The query execution unit generates a context when newly generating a task, and executes the generated task based on the generated context. The context is information including first information showing a processing step for starting an execution in the newly generated task is which of one or more processing steps represented by the query execution plan, second information relating to an access destination for data required in a processing step shown by the first information, and third information relating to data necessary for generating a result by the newly generated task.

Advantageous Effects of Invention

According to the present invention, a plurality of processor cores is used and the management overhead of a thread is reduced by executing a plurality of tasks by one thread and by executing the query by a plurality of threads As a result, the execution time of a query can be reduced.

BRIEF DESCRIPTION OF DRAWINGS

FIG. 4 is a view illustrating the definition of a table and index of a DB according to Embodiment 1.

FIG. 5 is a view showing one example of a Part table of a DB according to Embodiment 1.

FIG. 6 is a view showing one example of a Lineitem table of a DB according to Embodiment 1.

FIG. 12 is a view showing a first example of processing step execution state information according to Embodiment 1.

FIG. 13 is a view showing a second example of processing step execution state information according to Embodiment 1.

FIG. 14 is a view showing a third example of processing step execution state information according to Embodiment 1.

DESCRIPTION OF EMBODIMENTS

Embodiment 1

First, the outline of Embodiment 1 will be described.

Figure 1:
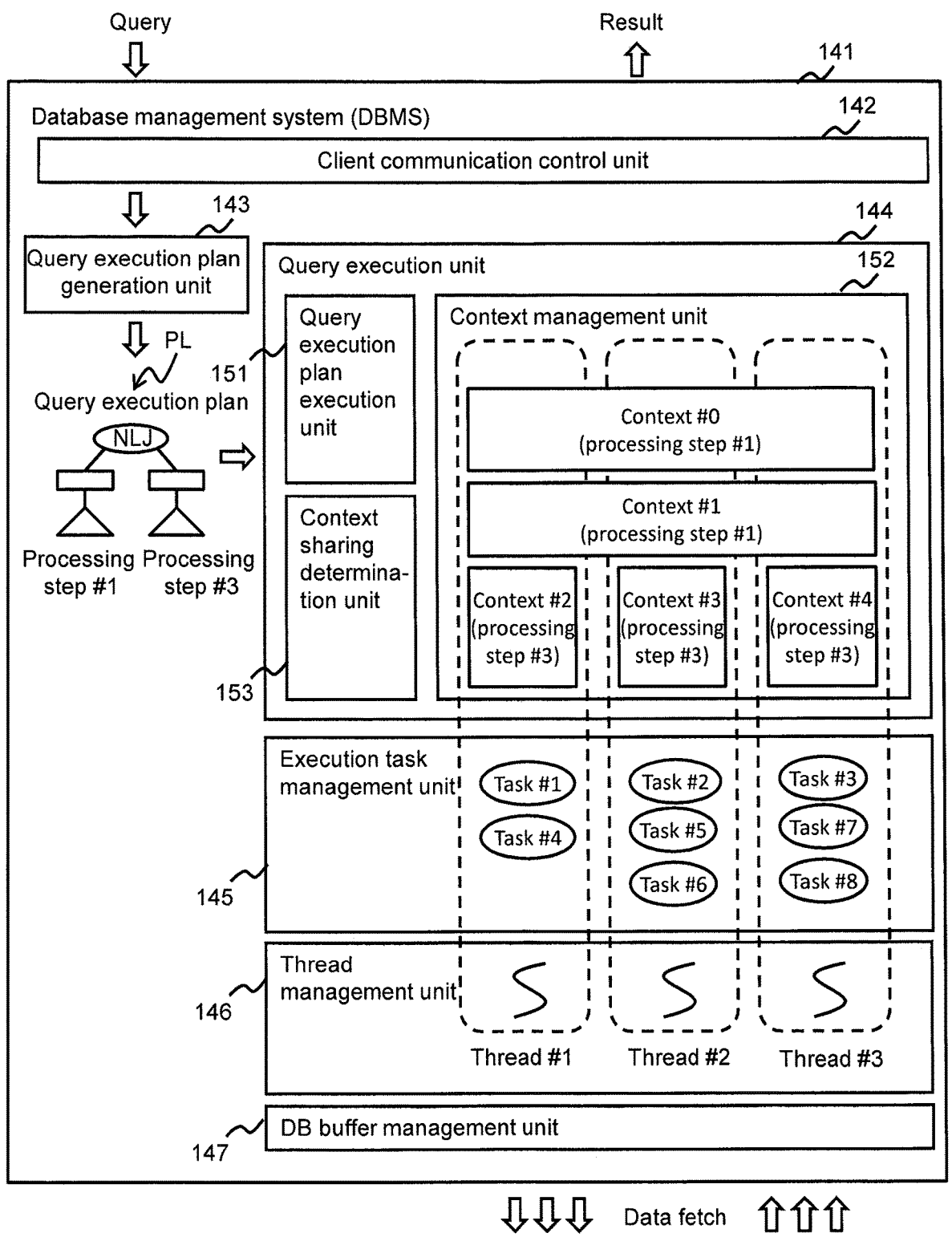
FIG. 1 is a view illustrating the outline of a DBMS according to Embodiment 1.

FIG. 1 is a view illustrating the outline of a DBMS according to Embodiment 1.

A DBMS 141 includes a client communication control unit 142, a query execution plan 143, a query execution unit 144, an execution task management unit 145, a thread management unit 146, and a DB buffer management unit 147. The query execution unit 144 includes a query execution plan execution unit 151, a context management unit 152, and a context sharing determination unit 153.

In the execution of a query, the DBMS 141 (query execution unit 144) dynamically generates a task for executing a processing step and executes the dynamically generated task. Specifically, in the execution of a query, for example, the DBMS 141 (query execution unit 144) performs (a) generating a task for executing a processing step, (b) executing the generated task to issue a data read request to a DB in order to read data necessary in the processing step corresponding to the task, (c) in the case of executing an (N+1)th processing step based on an execution result of an N-th processing step (N is an integer of 1 or greater) corresponding to the task executed in (b) described above, newly generating a task based on the execution result, and (d) performing of (b) described above and (c) described above for the newly generated task. In the case where two or more ready tasks exist in (b) and (d) described above, at least two tasks out of the two or more tasks can be executed concurrently.

Upon executing a task, the DBMS 141 (query execution unit 144) uses a plurality of threads (kernel threads) provided by an operating system (OS), and the plurality of threads are respectively executed by one or a plurality of processor cores included in one or a plurality of processors. By the processor core executing a thread, a task assigned to the thread is executed. Hereinafter, an expression such as a processor core executes a task or the DBMS 141 executes a task means executing a task assigned to the thread by executing the thread by a processor core.

The DBMS 141 receives a query via the client communication control unit 142. The query execution plan generation unit 143 generates a query execution plan PL for executing the received query. The query execution plan execution unit 151 executes the generated query execution plan PL. The thread management unit 146 manages a plurality of threads executed by a processor core of a processor in a computer in which the DBMS 141 is configured. The execution task management unit 145 manages a task executed with a thread. In this embodiment, the execution task management unit 145 can assign a plurality of tasks to one thread. Accordingly, the overhead required for management of a thread can be reduced.

The context management unit 152 manages a context used upon execution of a task. As a context, there are a context shared between threads that is managed to be usable from a plurality of threads and a context not shared between threads that is managed to be usable from only one thread. A thread that can use a context not shared between threads can use the context preferentially compared to other threads.

In an example in FIG. 1, context #0 and context #1 are contexts shared between threads, and context #2, context #3, and context #4 are contexts not shared between threads. Upon executing a task assigned to thread #1, thread #2, and thread #3, context #0 and context #1 are used. Upon executing a task assigned to thread #1, context #2 is used. Upon executing a task assigned to thread #2, context #3 is used. Upon executing a task assigned to thread #3, context #4 uses context #4.

Whether a context is to be shared between threads or not shared between threads is determined based on the result of determination by the context sharing determination unit 153. For example, the context sharing determination unit 153 may assume a context relating to a processing step at the start of a query execution plan to be a context shared between threads. In the case where a query execution plan is configured of a plurality of processing blocks concurrently executable, the context sharing determination unit 153 may assume a context relating to a first processing step of each processing block to be a context shared between threads. The context sharing determination unit 153 may assume a context relating to a processing step with a predetermined number or greater number of subsequent processing steps in one processing block to be a context shared between threads. A processing block may be configured of one or more processing steps. One example of a query execution plan configured of a plurality of processing blocks concurrently executable will be described later.

Figure 2:
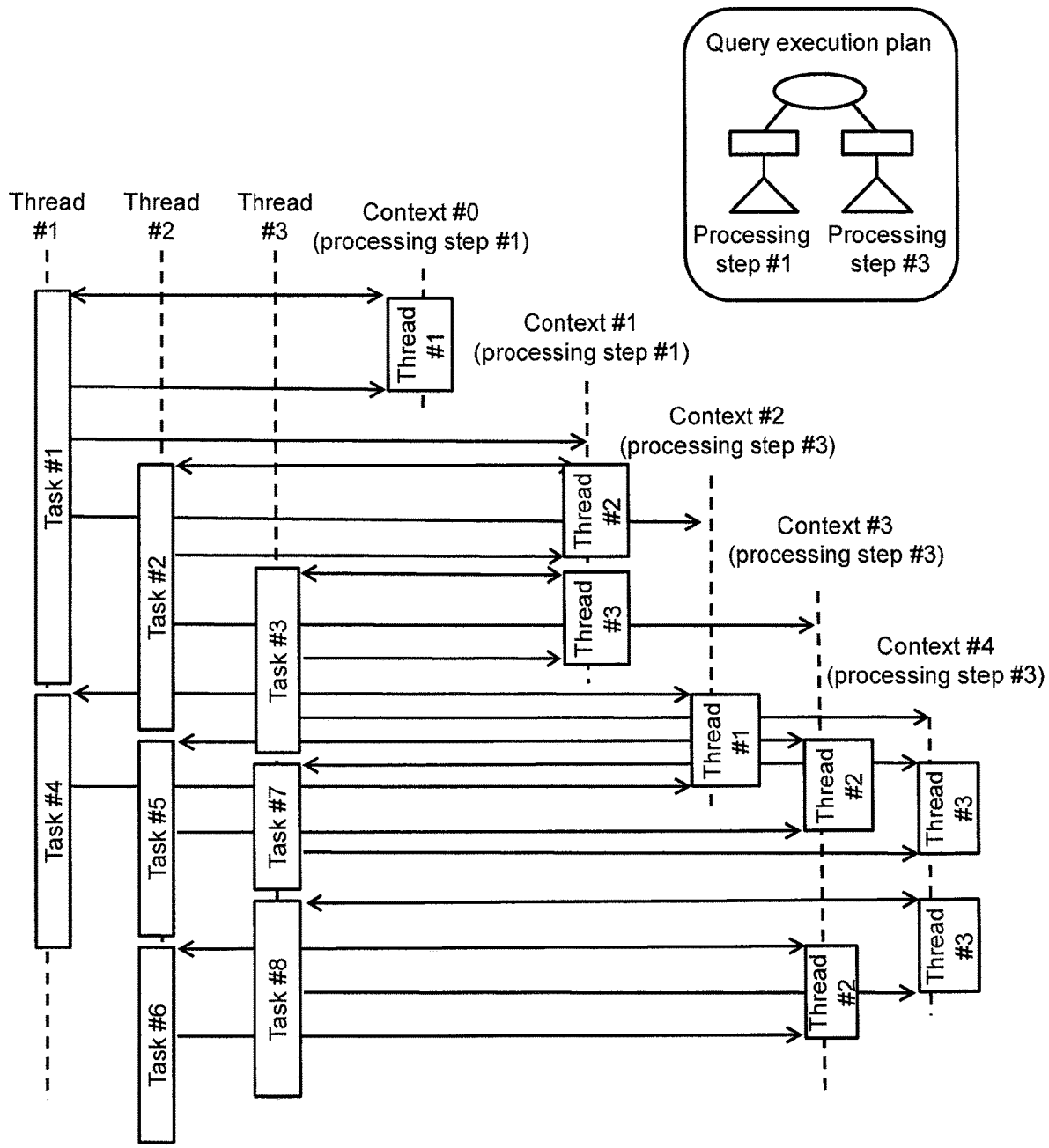
FIG. 2 is a view illustrating the execution of a query in a DBMS according to Embodiment 1.

FIG. 2 is a view illustrating the execution of a query in a DB management system according to Embodiment 1. In the drawing, the passage of time is expressed from the top toward the lower direction.

First, the thread management unit 146 generates thread #1, thread #2, and thread #3. It is possible to concurrently execute threads #1 to #3 with different processor cores, for example. The query execution plan execution unit 151 (specifically, one processor core) generates context #0 with which execution of a query is started and generates task #1. Context #0 is a context relating to processing step #1 at the start of a query execution plan and therefore is shared between threads. The query execution plan execution unit 151 assigns task #1 to thread #1. Thread #1 uses context #0 to execute task #1. When task #1 is executed, context #1 is generated, and task #2 and task #3 are generated. Context #1 is a context relating to processing step #1 at the start of the query execution plan and therefore is shared between threads. Thread #1 assigns task #2 to thread #2 and assigns task #3 to thread #3. Thread #2 uses context #1 to execute task #2. Thread #3 uses context #1 to execute task #3.

Thread #1 executes task #1 and executes an access processing for a DB. As a result, a new context is generated. For example, context #2 relating to processing step #3 is generated. The processing step of context #2 is not at the start of the query execution plan and therefore is not shared between threads. That is, context #2 is basically used by thread #1. Thread #1 generates and assigns, to thread #1, task #4. Thread #1 uses context #2 to execute task #4.

Thread #2 executes task #2 and executes an access processing for a DB. As a result, a new context is generated. For example, context #3 relating to processing step #3 is generated. The processing step of context #3 is not at the start of the query execution plan and therefore is not shared between threads. That is, context #3 is basically used by thread #2. Thread #2 generates and assigns, to thread #2, task #5 and task #6. Thread #2 uses context #3 to execute task #5. Further, thread #2 uses context #3 to execute task #6.

Thread #3 executes task #3 and executes an access process for a DB. As a result, a new context is generated. For example, context #4 relating to processing step #3 is generated. The processing step of context #4 is not at the start of the query execution plan and therefore is not shared between threads. That is, context #4 is basically used by thread #3. Thread #3 generates and assigns, to thread #3, task #7 and task #8. Thread #3 uses context #4 to execute task #7. Further, thread #3 uses context #4 to execute task #8.

In this manner, one thread executes a plurality of tasks, and a query is executed with a plurality of threads. As a result, the execution time of the query can be reduced, since a plurality of processor cores are used and the management overhead of a thread is reduced.

Embodiment 1 will be described in detail.

Figure 3:
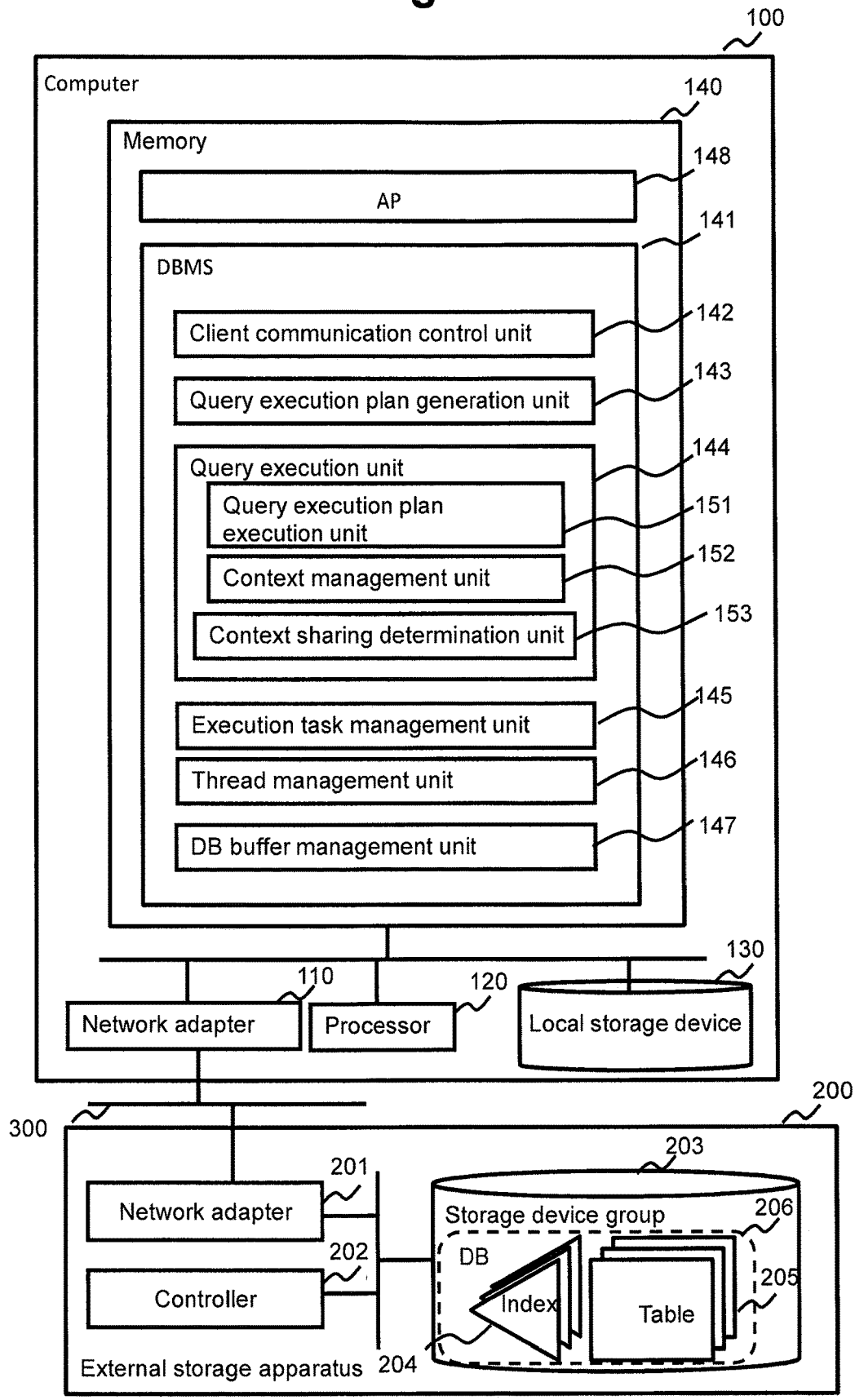
FIG. 3 is a configuration diagram of a computer system according to Embodiment 1.

FIG. 3 is a configuration diagram of a computer system according to Embodiment 1.

The computer system includes a computer 100 and an external storage apparatus 200. The computer 100 and the external storage apparatus 200 are connected via a communication network 300. As a protocol for communication via the communication network 300, FC (Fibre Channel), SCSI (Small Computer System Interface), IB (Infini Band), or TCP/IP (Transmission Control Protocol/Internet Protocol) may be employed, for example.

The computer 100 is, for example, a personal computer, a workstation, or a main frame. The computer 100 includes a network adapter 110, a processor (typically, microprocessor (e.g., CPU (Central Processing Unit)) 120, a local storage device 130, and a memory 140. The processor 120 executes a computer program, e.g., an OS (Operating System) that is not shown or the DBMS 141. One or multiple processors 120 include one or a plurality of processor cores. The respective processor cores are each capable of executing processing independently. A processor core has a cache with shorter access latency than the memory 140. A processor core holds, in a cache, data recorded in the memory 140 to perform processing of the data. In the case where one processor core processes the same data consecutively, the processing time is shorter compared to a case where different processor cores process the same data consecutively, since data held in a cache can be used. Basically, in this embodiment, each processor core can execute one thread (kernel thread) at a given time point. The memory 140 temporarily stores a program executed by the processor 120 and data used by the program. In this embodiment, the memory 140 stores the DBMS 141 as a program that performs management of a DB or a relevant processing sequence and data. The memory 141 may store an AP (Application Program) 148 for issuing a query to the DBMS 141. The local storage device 130 stores a program and data used by the program. The network adapter 110 connects the communication network 300 and the computer 100. The processor 120 may be a component included in a control device coupled to the network adapter 110, the memory 140, and the like. The control device may include, in addition to the processor 120, a dedicated hardware circuit (e.g., circuit that performs encryption and decryption of data).

In terms of performance and redundancy, the computer 100 may include a plurality of components, for at least one of the network adapter 110, the processor 120, the local storage device 130, and the memory 140. The computer 100 may include an input device (e.g., keyboard and pointing device) and a display device (e.g., liquid crystal display) that are not shown. The input device and the display device may be integrated.

In the computer 100, the DBMS 141 executes a query issued with respect to the DBMS 141. The query is issued by the AP 148 executed by the computer 100 or an AP executed by a computer (client) that is not shown and coupled to the communication network 300. The DBMS 141 executes a query issued by the AP 148 and, along with the execution of the query, transmits an I/O request with respect to a DB 206 stored in the external storage apparatus 200 to the external storage apparatus 200 via an OS. The OS may be an OS that runs on a virtual machine created and executed by a virtualization program.

The external storage apparatus 200 stores data used by the computer 100. The external storage apparatus 200 receives an I/O request from the computer 100, executes a processing corresponding to the I/O request, and transmits the processing result to the computer 100.

The external storage apparatus 200 includes a network adapter 201, a storage device group 203, and a controller 202 connected thereto.

The network adapter 201 connects the external storage apparatus 200 to the communication network 300.

The storage device group 203 includes one or more storage devices. A storage device is a non-volatile storage medium, e.g., a magnetic disk, a flash memory, or other semiconductor memories. The storage device group 203 may be a group storing data in a predetermined RAID level, according to RAID (Redundant Array of Independent Disks). A logical storage device (logical volume) based on a storage space in the storage device group 203 may be provided to the computer 100. The storage device group 203 stores the DB 206. The DB 206 includes one or more tables 204 or indexes 205. A table is a set of one or more records, and a record is configured of one or more columns. An index is a data structure that is intended and created for one or more columns within a table to increase the speed of access to a table with a selecting condition including a column for which the index is intended. For example, an index is a data structure holding, for each value of an intended column, information (Row ID) with which a record within a table including the value is identified. A B-tree structure or the like is used. The configuration example of a table of a DB and one example of the relationship of tables will be described later.

The controller 202 includes, for example, a memory and a processor. According to an I/O request from the computer 100, data is input to or output from the storage device group 203 storing the DB 206. For example, the controller 202 stores, in the storage device group 203, data of a write target according to a write request from the computer 100 or reads, from the storage device group 203, data of a read target according to a read request from the computer 100 to transmit the data to the computer 100.

The external storage apparatus 200 may include a plurality of components such as the controllers 202, in terms of ensuring performance and redundancy. Multiple external storage apparatuses 200 may be included.

The DBMS 141 manages the DB 206 including business data. The DBMS 141 includes the client communication control unit 142, the query execution plan generation unit 143, the query execution unit 144, the execution task management unit 145, the thread management unit 146, and the DB buffer management unit 147.

The client communication control unit 142 controls communication with a client coupled to the communication network 300 or the AP 148. Specifically, the client communication control unit 142 receives (accepts) a query issued from a client or the AP 148 and executes a processing of transmitting the processing result of the query to the client or the AP 148. The query is written in SQL (Structure Query Language), for example.

The query execution plan generation unit 143 generates a query execution plan including one or more processing steps necessary for executing a query received by the client communication control unit 142. A query execution plan is, for example, information in which the order of execution of processing steps to be performed upon execution of a query is defined with a tree structure, and is stored in the memory 140. One example of a query execution plan will be described later.

The DB buffer management unit 147 manages a storage area (DB buffer) for temporarily storing data within the DB 206. A DB buffer is configured in the memory 140. A DB buffer may be configured in the local storage device 130.

The query execution unit 144 executes a query according to a query execution plan generated by the query execution plan generation unit 143 and returns the generated result to an issue source of the query. The query execution unit 144 includes the query execution plan execution unit 151, the context management unit 152, and the context sharing determination unit 153.

The query execution plan execution unit 151 dynamically generates a task for executing a processing step within a query execution plan, assigns a task to a thread, and executes a query through execution of the task with the thread.

The context management unit 152 manages a context including information necessary in the execution of a generated task. A context is information including first information showing a processing step for starting execution in a task is which of one or more processing steps represented by a query execution plan, second information relating to an access destination for data required in the processing step shown by the first information, and third information relating to data necessary for generating a result with the task. The structure of the context management information that is information for managing a context will be described later.

The context sharing determination unit 153 determines whether or not a context is to be shared between a plurality of threads.

The execution task management unit 145 manages a task executed by a thread. A task is, for example, a pseudo process or pseudo thread (user-level thread) implemented by a DBMS 412. A task may be a set of pointers (function pointers) to a function in which each processing is summarized as a function. The structure of task management information that is information for managing a task will be described later.

The thread management unit 146 manages a thread for executing a query. A thread is a thread (kernel thread) provided an OS. As described above, a task assigned to a thread is executed by a processor core executing the thread that is assigned. A process may be used instead of a thread.

At least a part of processing performed by at least one processing unit of the client communication control unit 142, the query execution plan generation unit 143, the query execution unit 144, and the DB buffer management unit 147 may be performed with hardware. In the case where the processing unit is a subject in the description in this embodiment, processing is actually performed by the processor 120 that executes the processing unit. However, in the case where at least a part of the processing unit is realized by hardware, the hardware may be a subject instead of or in addition to the processor 120. A computer program that realizes the DBMS 141 may be installed in the computer 100 from a program source. A program source may be a storage medium readable by the computer 100 or may be another computer, for example.

The configuration of the DBMS 141 shown in FIG. 3 is one example. For example, it may be such that a certain processing unit is divided into a plurality of processing units or one processing unit in which functions of a plurality of processing units are integrated is configured.

FIG. 4 is a view illustrating the definition of a table and index of a DB according to Embodiment 1.

The DB 206 includes, for example, as Table 205 a Part table including column c1 and column c2 and a Lineitem table including column c3 and column c4. The DB 206 includes, as the index 204, an index (Part index) relating to the Part table based on the value of column c1 and an index (Lineitem index) relating to the Lineitem table based on the value of column c3.

FIG. 5 is a view showing one example of a Part table of a DB according to Embodiment 1.

The Part table of the DB 206 is logically a table in which the value of column c1 and the corresponding value of column c2 are associated, for example.

FIG. 6 is a view showing one example of a Lineitem table of a DB according to Embodiment 1.

The Lineitem table of the DB 206 is a table in which the value of column c3 and the corresponding value of column c4 are associated, for example.

Figure 7:
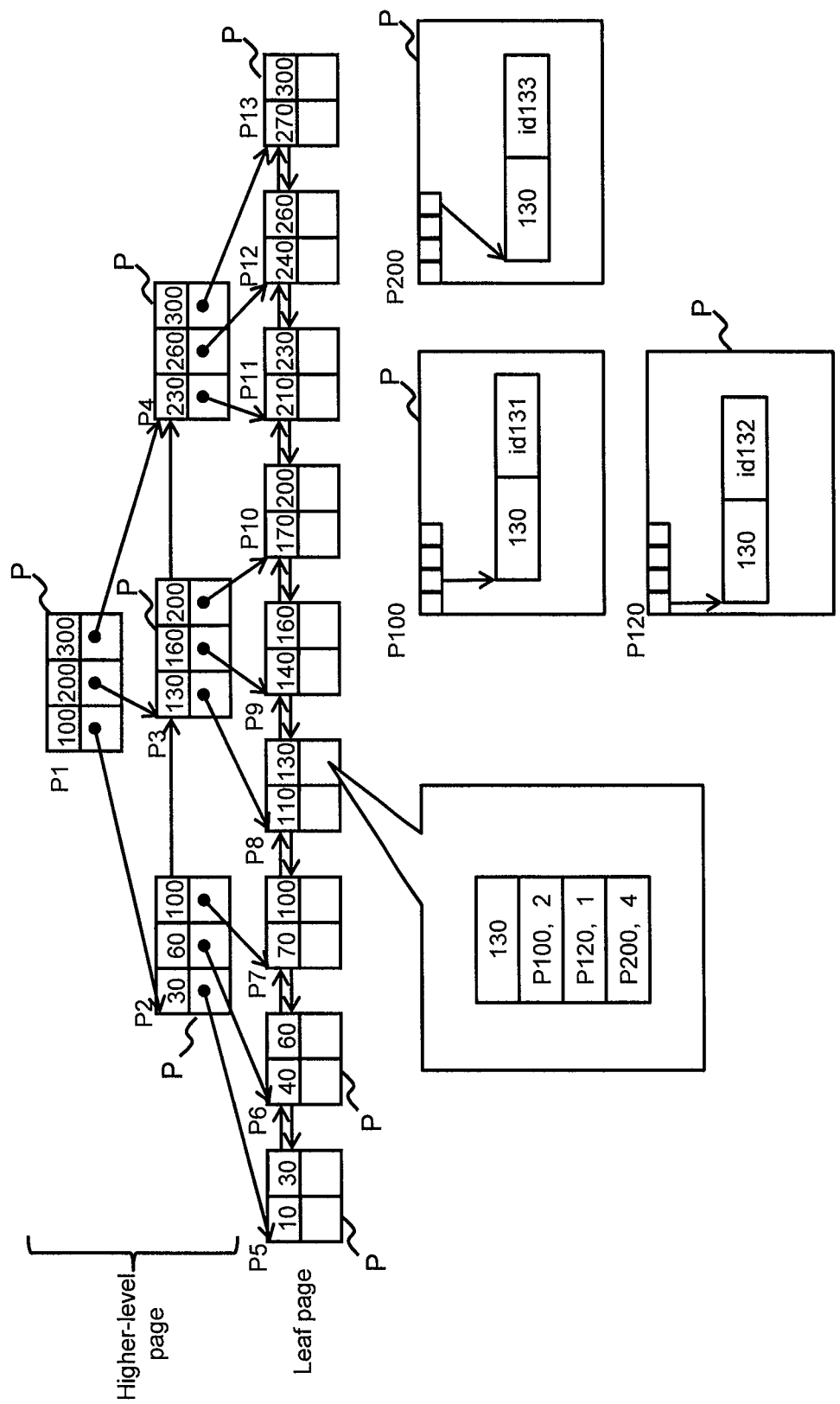
FIG. 7 is a view illustrating one example of a data structure of a Part index and Part table in a DB according to Embodiment 1.

FIG. 7 is a view illustrating one example of a data structure of a Part index and Part table in a DB according to Embodiment 1.

The Part index is, for example, in a B-tree structure to search for a page and slot of the Part table storing the corresponding value of column c2 based on the value of column c1. A page is the minimum data unit in the input and output with respect to the DB 206. In this embodiment, the Part index manages page P in a hierarchical structure. In the Part index, there are a leaf page that is a page at the lowest level and a higher-level page that is a page at a higher level than a leaf page. A page at the highest level among the higher-level pages is referred to as a root page.

The root page (page P1) of the Part index is provided with one or more entries in which a pointer with respect to a page on a level immediately below and the maximum value for the value of column c1 as a management target of the page on the level immediately below are associated. For example, page P1 stores a pointer to page P2 managing the correspondence relationship with respect to the value of column c1 that is less than or equal to "100," a pointer to page P3 managing the correspondence relationship with respect to the value of column c1 that is greater than "100" and less than or equal to "200," and a pointer to page P4 managing the correspondence relationship with respect to the value of column c1 that is greater than "200" and less than or equal to "300." In a similar manner, a higher-level page is provided with one or more entries in which a pointer with respect to a page on a level immediately below each page and the maximum value for the value of column c1 managed in the page on the level immediately below are associated.

A leaf page stores one or more rows (records) in which the value of column c1 and the storage location (e.g., a page number of the Part table and a slot number within the page) in the Part table storing the value of column c2 corresponding to the value are associated.

For example, page P8 that is a leaf page stores a row including the number of a page and slot storing the value of column c2 corresponding to the value "110" of column c1 and a row including the number of a page and slot storing the value of column c2 corresponding to the value "130" of column c1. For example, as the row including the number of the page and slot storing the value of column c2 corresponding to the value "130" of column c1, rows showing slot 2 in page P100, slot 1 in page P120, and slot 4 in page P200 are stored. Thus, the values of column c2 corresponding to the value "130" of column c1 are "id131" from a record of slot 2 in page P100 of the Part table, "id132" from a record of slot 1 in page P120 of the Part table, and "id133" from a record of slot 4 in page 200 of the Part table.

Figures 8, 9:
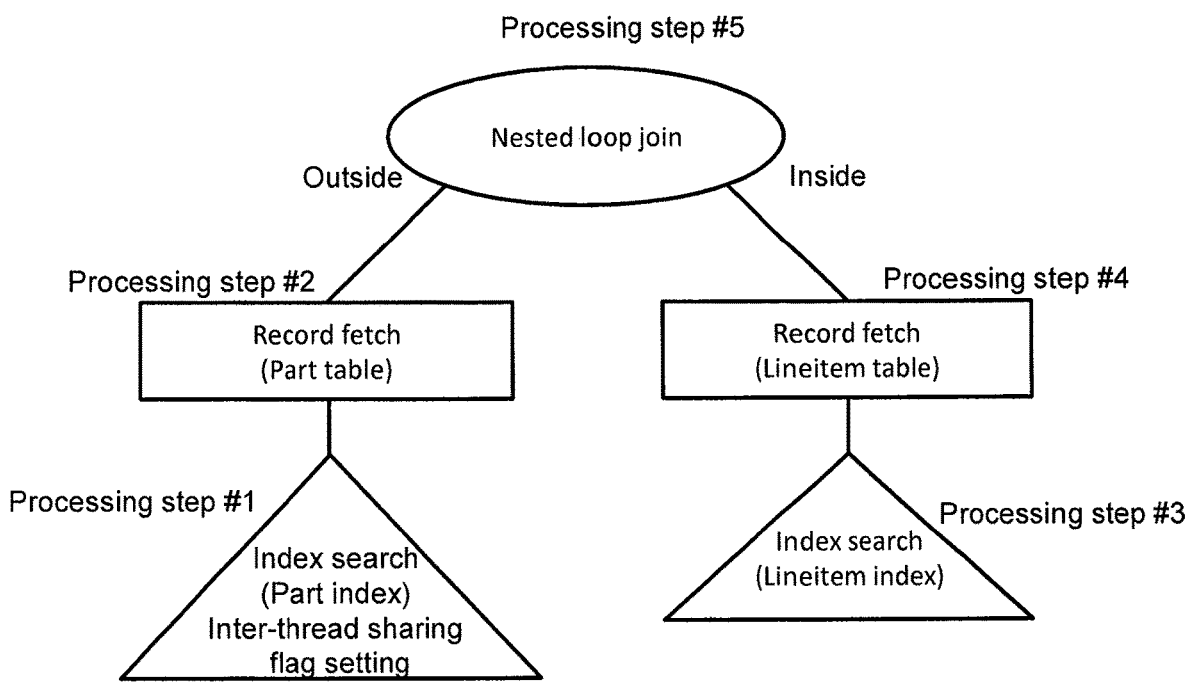
FIG. 8 is a view showing one example of a query of a DB according to Embodiment 1.
FIG. 9 is a view showing one example of a query execution plan according to Embodiment 1.

FIG. 8 is a view showing one example of a query of a DB according to Embodiment 1.

The query shown in FIG. 8 is one example of a query with respect to the DB 206 with the structure shown in FIG. 4 to FIG. 7. The query shown in FIG. 8 means that the value of column c1 and the value of column c4 are extracted from the Part table and the Lineitem table where the value of column c1 is "130" and the value of column c2 and the value of column c3 are the same.

FIG. 9 is a view showing one example of a query execution plan according to Embodiment 1.

The query execution plan shown in the figure shows a query execution plan generated by the query execution plan generation unit 143 in the case where the DBMS 141 has received the query shown in FIG. 8.

As shown in FIG. 9, the query execution plan corresponding to the query shown in FIG. 8 includes processing step #1 of performing an index search with the Part index, processing step #2 of acquiring a record from the Part table, processing step #3 of performing an index search with the Lineitem index, processing step #4 of acquiring a record from the Lineitem table, and processing step #5 of performing a nested loop join with the results.

Figure 10:
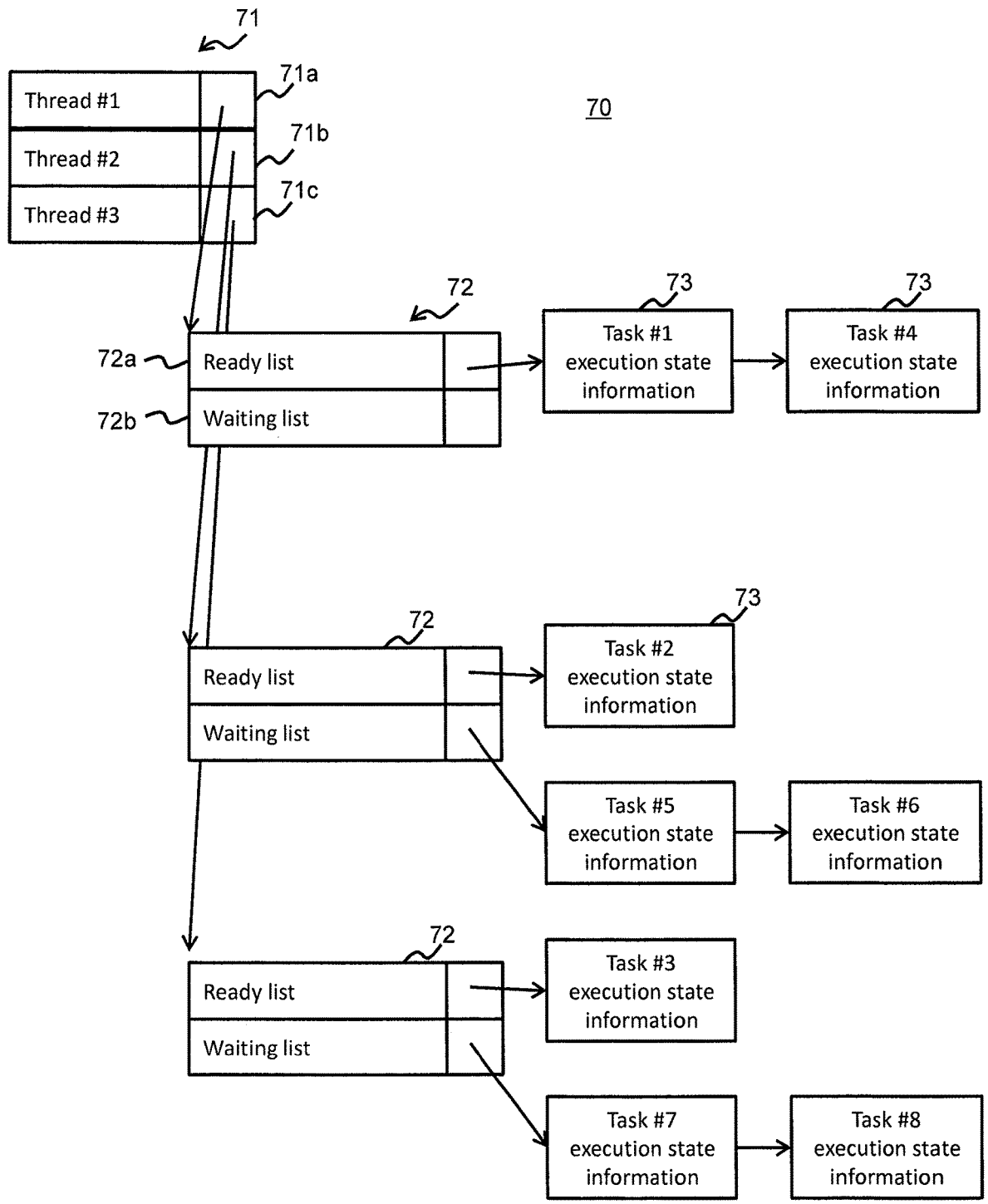
FIG. 10 is a view showing one example of a data structure of task management information according to Embodiment 1.

FIG. 10 is a view showing one example of a data structure of task management information according to Embodiment 1.

The task management information includes a main data structure 71. The main data structure 71 associates and stores, for each thread, thread identification information (e.g., thread number) with which a plurality of threads are identified and a pointer to a list management structure 72 with which a task executed by a thread is managed.

The list management structure 72 stores a ready list 72a for managing a ready task in a corresponding thread and a waiting list 72b for managing a task in a waiting state in a corresponding thread. The ready list 72a includes a pointer to execution state information (task execution state information) 73 relating to a ready task in a corresponding thread. The task execution state information 73 includes a pointer to the task execution state information 73 relating to another ready task in a correspond thread.

For example, in FIG. 10, execution state information (task #2 execution state information) with respect to task #2 is managed as the task execution state information 73 relating to a ready task in thread #2, and the task execution state information 73 of task #5 and task #6 is managed as the task execution state information 73 relating to a task in a waiting state in thread #2. In the case where tasks are uneven between a plurality of threads, a task (i.e., the task execution state information 73) may be transferred to a list of another thread.

In this embodiment, a ready list and a waiting list are managed for each thread. However, a ready list and a waiting list may be shared between a plurality of threads. A ready list and a waiting list may be managed for each processing step.

Figure 11:
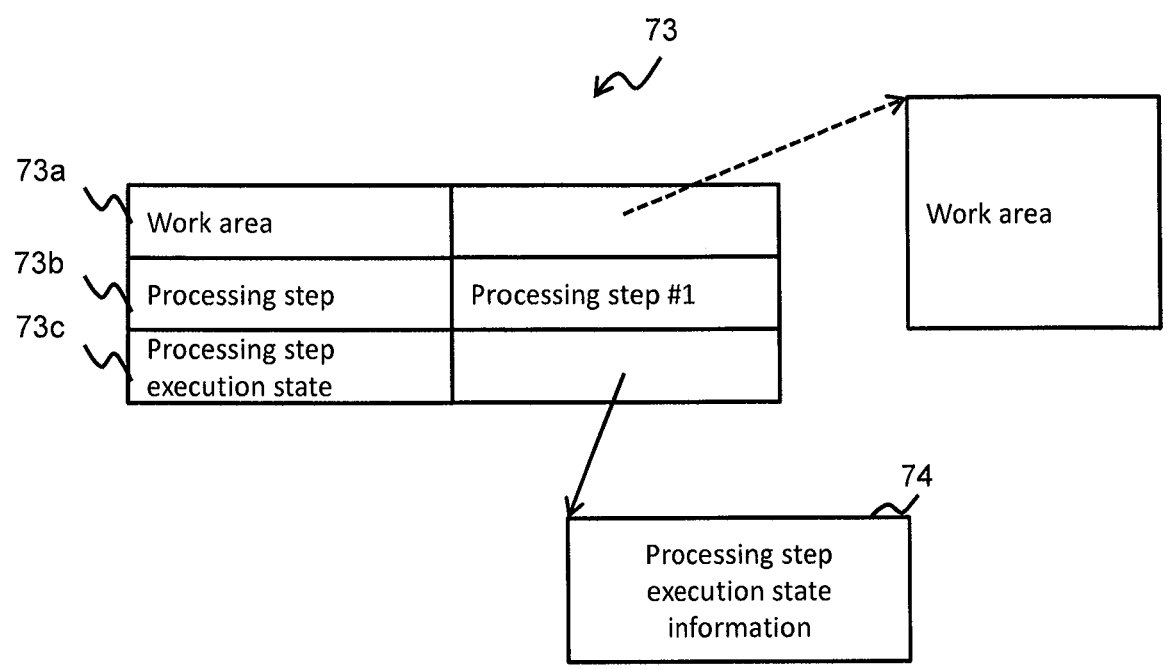
FIG. 11 is a view showing one example of task execution state information according to Embodiment 1.

FIG. 11 is a view showing one example of task execution state information according to Embodiment 1.

The task execution state information 73 stores a work area 73a, a processing step 73b, and a processing step execution state 73c. The work area 73a stores a pointer showing a work area. The processing step 73b stores information, e.g., a processing step number, with which a processing step executed by a corresponding task is identified. The processing step execution state 73c stores execution state information (processing step execution state information) 74 of a corresponding processing step. A specific example of the processing step execution state information 74 will be described later.

FIG. 12 is a view showing a first example of processing step execution state information according to Embodiment 1. FIG. 12 shows processing step execution state information for a task that uses a higher-level page in an index search.

Processing step execution state information 74A includes a search condition 74a, a page number 74b, and a slot number 74c. The search condition 74a stores a search condition. In the example in the figure, the search condition 74a stores a range "115≤key≤195" for a key value that is a search condition included in a query. The page number 74b stores a number (page number) of a higher-level page used in processing of a task. The slot number 74c stores a number (slot number) of a slot in a page used in processing of a task.

FIG. 13 is a view showing a second example of processing step execution state information according to Embodiment 1. FIG. 13 shows processing step execution state information for a task that uses a leaf page in an index search.

Processing step execution state information 74B includes a search condition 74d, a page number 74e, a slot number 74f, and a processing row ID number 74g. The search condition 74d stores a search condition. In the example in the figure, the search condition 74d stores a range "115≤key≤195" for a key value that is a search condition. The page number 74e stores a page number of a leaf page used in processing of a task. The slot number 74f stores a slot number of a slot in a page used in processing of a task. The processing row ID number 74g stores an ID number (processing row ID number) of a row within a slot processed with a corresponding task.

FIG. 14 is a view showing a third example of processing step execution state information according to Embodiment 1. FIG. 14 shows processing step execution state information for a task that performs record fetch.

Processing step execution state information 74C includes a page number 74h and a slot number 74i. The page number 74h stores a page number of a page used in processing of a task. The slot number 74i stores a slot number of a slot in a page used in processing of a task.

Figure 15:
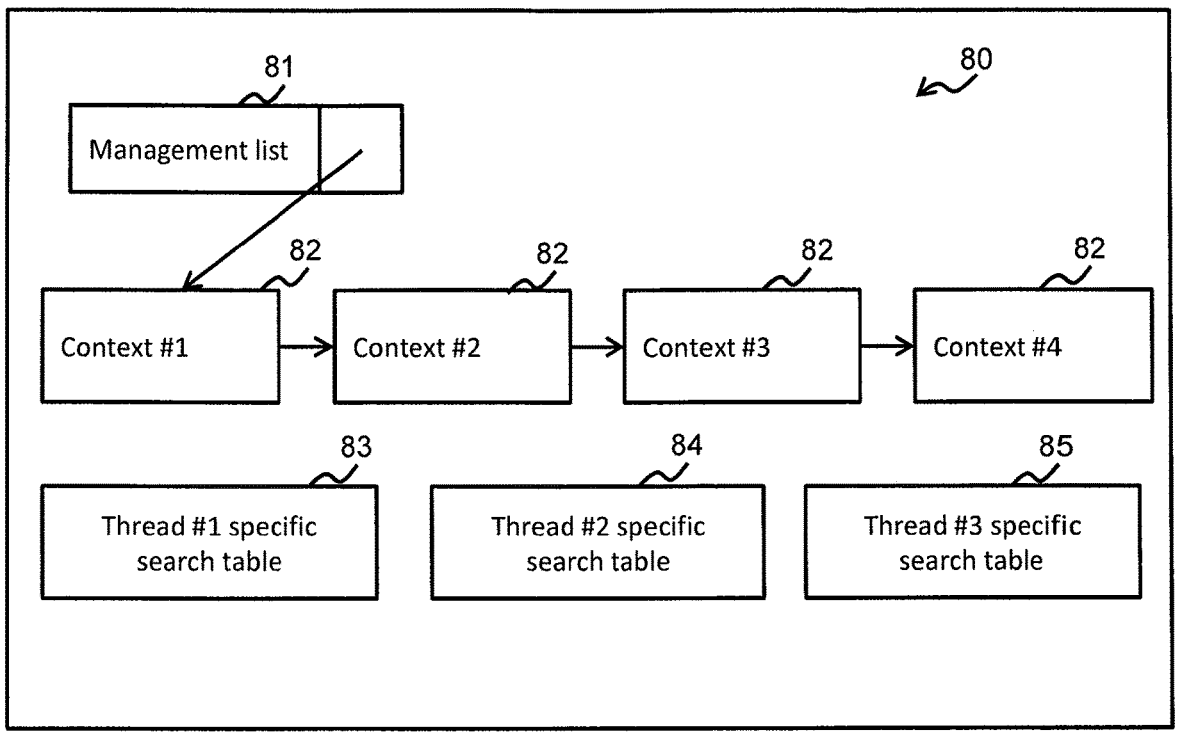
FIG. 15 is a view illustrating one example of a data structure of context management information according to Embodiment 1.

FIG. 15 is a view illustrating one example of the data structure of context management information according to Embodiment 1.

Context management information 80 includes a main structure 81 of a management list and a plurality of contexts 82. The main structure 81 stores a pointer to the context 82. Each context 82 stores a pointer to another context 82. In this embodiment, a thread executing a task performs a lock in units of the respective contexts 82, in the case of using the context 82 in processing of the task. A context in a locked state cannot be used by another thread.

The context management information 80 stores search tables (thread specific search tables) 83, 84, 85, and the like corresponding to a thread executing a query. The thread #1 specific search table 83 manages a pointer to the context 82 available to thread #1. The thread #2 specific search table 84 manages a pointer to the context 82 available to thread #2. The thread #3 specific search table 85 manages a pointer to the context 82 available to thread #3.

Figure 16:
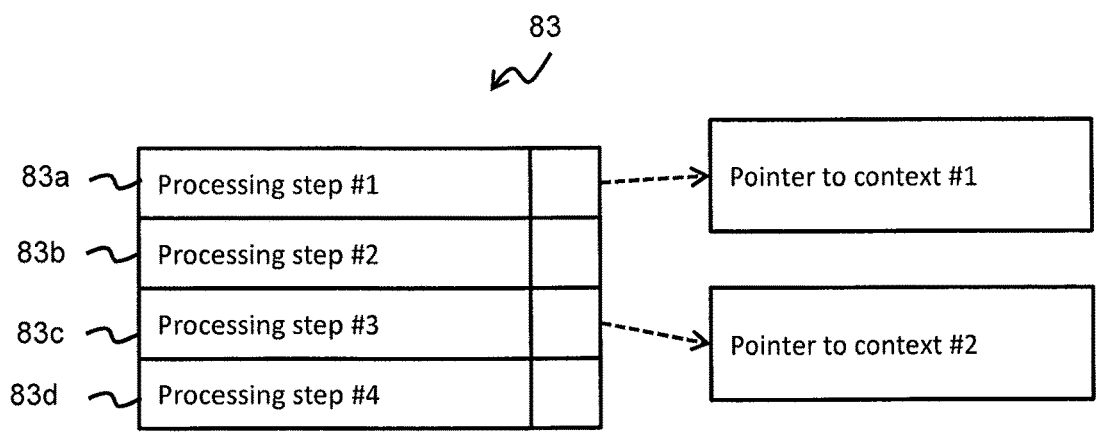
FIG. 16 is a view showing one example of a thread #1 specific search table according to Embodiment 1.
Figure 17:
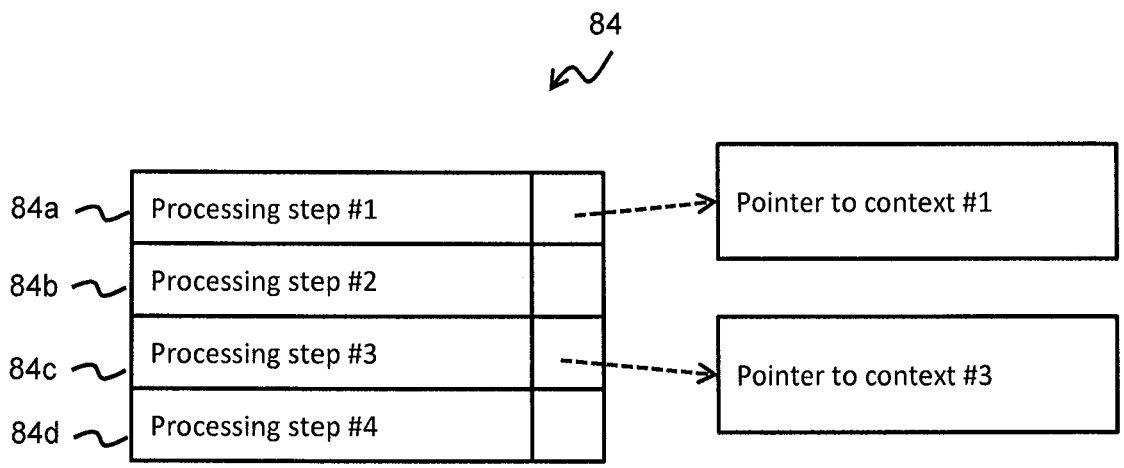
FIG. 17 is a view showing one example of a thread #2 specific search table according to Embodiment 1.
Figure 18:
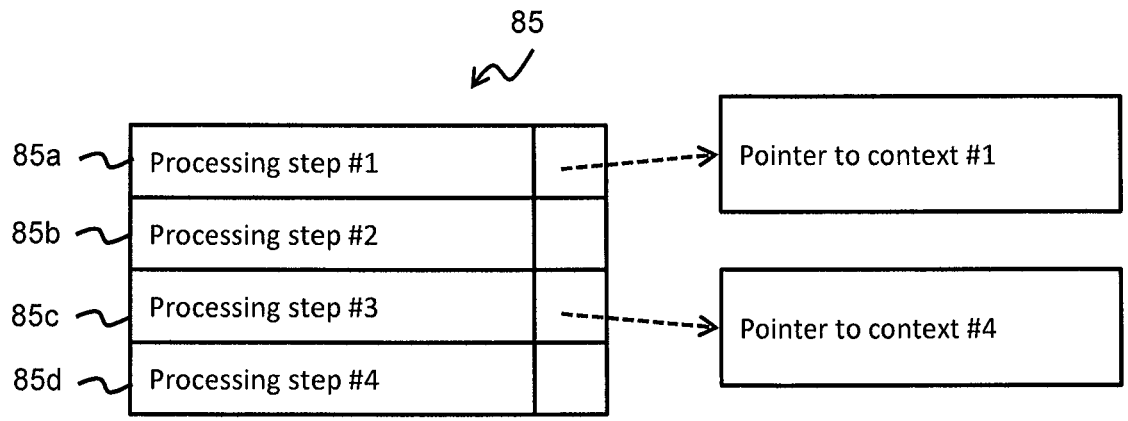
FIG. 18 is a view showing one example of a thread #3 specific search table according to Embodiment 1.

FIG. 16 is a view showing one example of a thread #1 specific search table according to Embodiment 1. FIG. 17 is a view showing one example of a thread #2 specific search table according to Embodiment 1. FIG. 18 is a view showing one example of a thread #3 specific search table according to Embodiment 1.

The thread #1 specific search table 83 is a table managing a pointer to a context available to thread #1 and manages a list of pointers to contexts relating to respective processing steps. As shown in FIG. 16, a pointer 83a to a context relating to processing step #1, a pointer 83b to a context relating to processing step #2, a pointer 83c to a context relating to processing step #3, and a pointer 83d to a context relating to processing step #4 are included. In this embodiment, the pointer 83a stores a pointer to context #1, and the pointer 83c stores a pointer to context #2.

The thread #2 specific search table 84 is a table managing a pointer to a context available to thread #2 and manages a list of pointers to contexts relating to respective processing steps. As shown in FIG. 17, a pointer 84a to a context relating to processing step #1, a pointer 84b to a context relating to processing step #2, a pointer 84c to a context relating to processing step #3, and a pointer 84d to a context relating to processing step #4 are included. In this embodiment, the pointer 84a stores a pointer to context #1, and the pointer 84c stores a pointer to context #3.

The thread #3 specific search table 85 is a table managing a pointer to a context available to thread #3 and manages a list of pointers to contexts relating to respective processing steps. As shown in FIG. 18, a pointer 85a to a context relating to processing step #1, a pointer 85b to a context relating to processing step #2, a pointer 85c to a context relating to processing step #3, and a pointer 85d to a context relating to processing step #4 are included. In this embodiment, the pointer 85a stores a pointer to context #1, and the pointer 85c stores a pointer to context #4.

According to the thread #1 specific search table 83, the thread #2 specific search table 84, and the thread #3 specific search table 85, context #1 is available to thread #1, thread #2, and thread #3. Context #2 is available to thread #1. Context #3 is available to thread #2, and context #4 is available to thread #3. A state where a pointer to the context 82 is registered in a plurality of thread specific search tables is referred to as the context being shared between threads, and a state where a pointer to a context is registered in one particular thread specific search table is referred to as the context being not shared between threads. A context that is available to a processor core executing a certain thread, through use of a thread specific search table specific to the thread, is referred to as a context available to the thread.

In this state, context #1 is used by thread #1, thread #2, or thread #3, context #2 is used by thread #1, context #3 is used by thread #2, and context #4 is used by thread #3. Since a context not shared between threads is used consecutively by one thread in this state, the processing time for processing along with context use can be reduced with a cache of a processor core.

In this embodiment, a thread specific search table specific to another thread may be referenced for the purpose of equalizing the amount of tasks executed by threads, in the case where available contexts are uneven between threads. Specifically, in the case where a context available to a thread is absent, a thread specific search table specific to another thread is referenced, so that another thread uses a context (context #2, context #3, or context #4) not shared between threads. For example, in the case where a context available to thread #1 has become absent in thread #1, thread #1 references the thread #2 specific search table or thread #3 specific search table, and context #3 or context #4 is used by a task assigned to thread #1.

Figure 19:
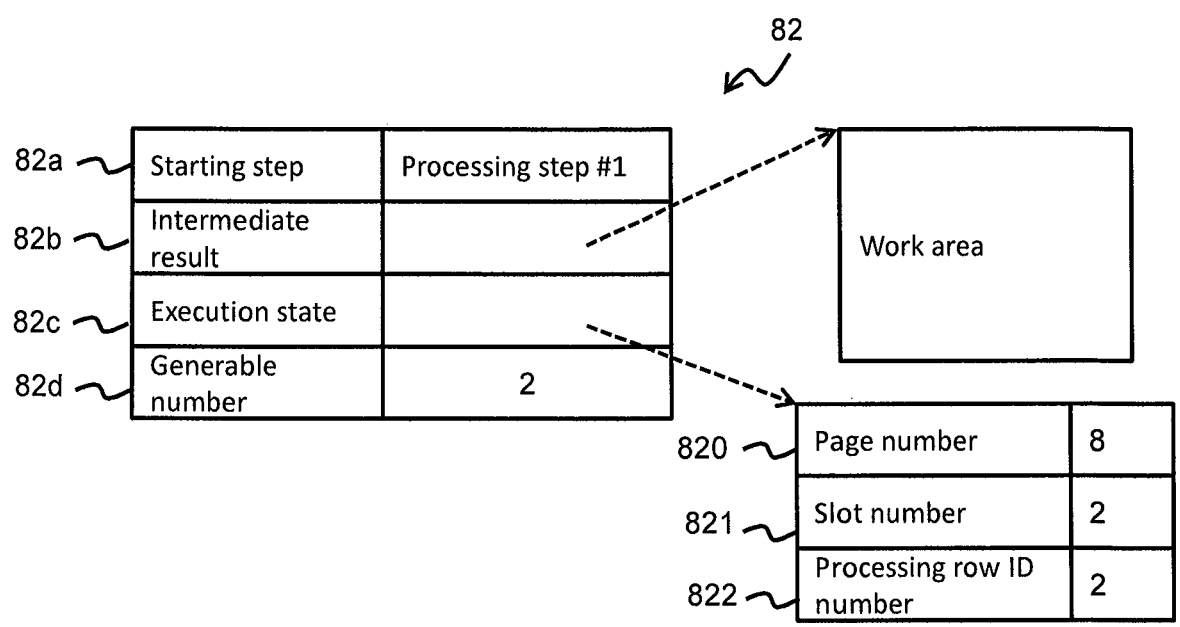
FIG. 19 is a view showing one example of a context according to Embodiment 1.

FIG. 19 is a view showing one example of a context according to Embodiment 1.

The context 82 includes a starting step 82a, an intermediate result 82b, an execution state 82c, and a generable number 82d. The starting step 82a stores the number of a corresponding processing step. The intermediate result 82b stores a pointer showing a work area storing an intermediate result necessary for a task that executes a corresponding processing step. An intermediate result is acquired data that is necessary for generating a result of a query. The execution state 82c stores the execution state of a task in a corresponding processing step, e.g., information (e.g., a page number 820, a slot number 821, and a processing row ID number 822) with which the content of processing of a task to be executed next is identified. The page number 820 stores a page number of a leaf page used in processing of the next task. The slot number 821 stores a slot number in a page used in processing of the next task. The processing row ID number 822 stores an ID number (processing row ID number) of a row within a slot used in processing of the next task. The generable number 82d stores the number of tasks (task generable number) that can further be generated in a corresponding processing step. The task generable number is the number of processing operations under which no task generation is implemented within the number of logically branched processing operations. For example, in the case where the key value "130" is the condition for an index search with the Part index shown in FIG. 7, there are three row IDs as entries corresponding to the key value "130" in page P8. Therefore, as a whole, three tasks of acquiring a record of the Part table can be generated using the three row IDs. Since one row ID is processed with a task that generates a context, the remaining two tasks can be generated from the generated context. Therefore, the task generable number is "2."

Figure 20:
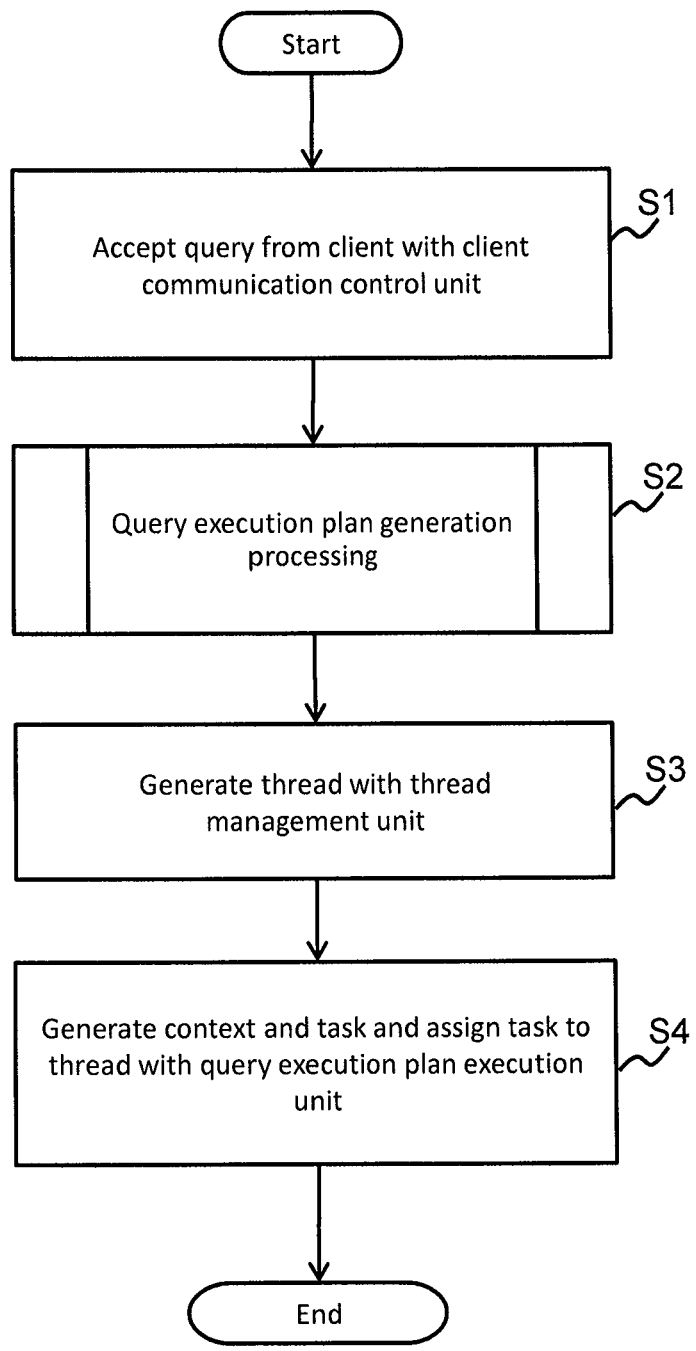
FIG. 20 is a flowchart of a processing at the time of query acceptance according to Embodiment 1.

FIG. 20 is a flowchart of a processing at the time of query acceptance according to Embodiment 1.

Upon acceptance of a query from the AP 148 (step S1) in the processing at the time of query acceptance, the client communication control unit 142 passes the received query to the query execution plan generation unit 143, and the query execution plan generation unit 143 executes a query execution plan generation processing (see FIG. 21) (step S2).

After execution of the query execution plan generation processing, the thread management unit 146 generates a thread (step S3). The number of threads to be generated may be any number and may be, for example, the same number as the number of processor cores of the processor 120. A processor core that runs a thread may be designated as a particular processor core for each thread. That is, a processor affinity may be set. For example, the setting may be such that the same number of threads as the number of processor cores are generated, and each processor core executes one of the threads. Accordingly, the efficiency of processing by each thread is high. As a method of generating a thread, there is a method of using an interface (function) of thread generation, specifically, pthread_create( ), provided by an OS.

Next, with the query execution plan execution unit 151, a context with which execution of a query is started is generated, and a task that performs processing using the context is generated and assigned to one of the threads (step S4). For example, a task is assigned to a thread created first by the thread management unit 146. Accordingly, thereafter, a processor core of the processor 120 executes the thread, and the task assigned to the thread is executed by the thread.

Figure 21:
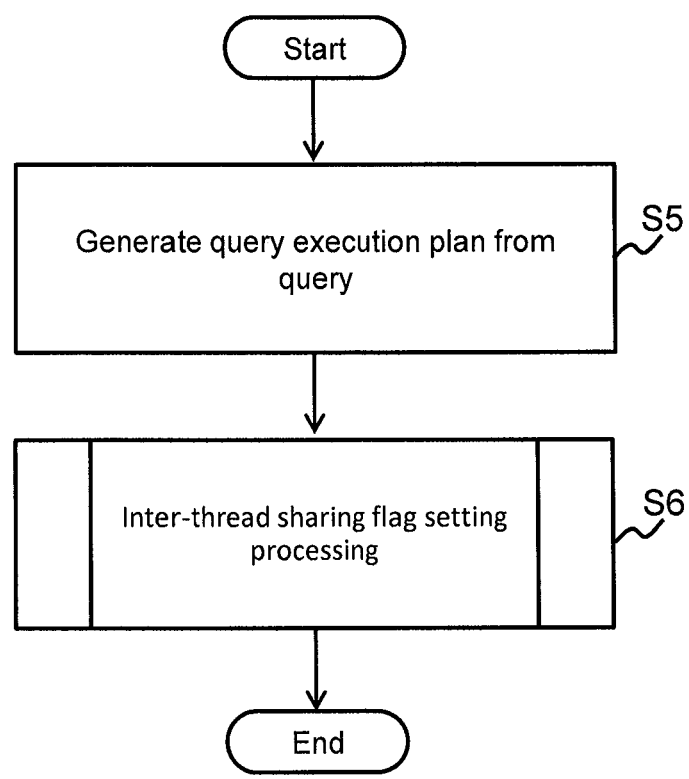
FIG. 21 is a flowchart of a query execution plan generation processing according to Embodiment 1.

FIG. 21 is a flowchart of a query execution plan generation processing according to Embodiment 1.

The query execution plan generation processing is a processing corresponding to step S2 of the processing at the time of query acceptance shown in FIG. 20. The query execution plan generation unit 143 generates a query execution plan from the query passed from the client communication control unit 142 (step S5). For example, in the case where the query shown in FIG. 8 has been received, the query execution plan shown in FIG. 9 is generated. Next, the query execution plan generation unit 143 executes an inter-thread sharing flag setting processing (see FIG. 22) (step S6) and terminates the query execution plan generation processing.

Figure 22:
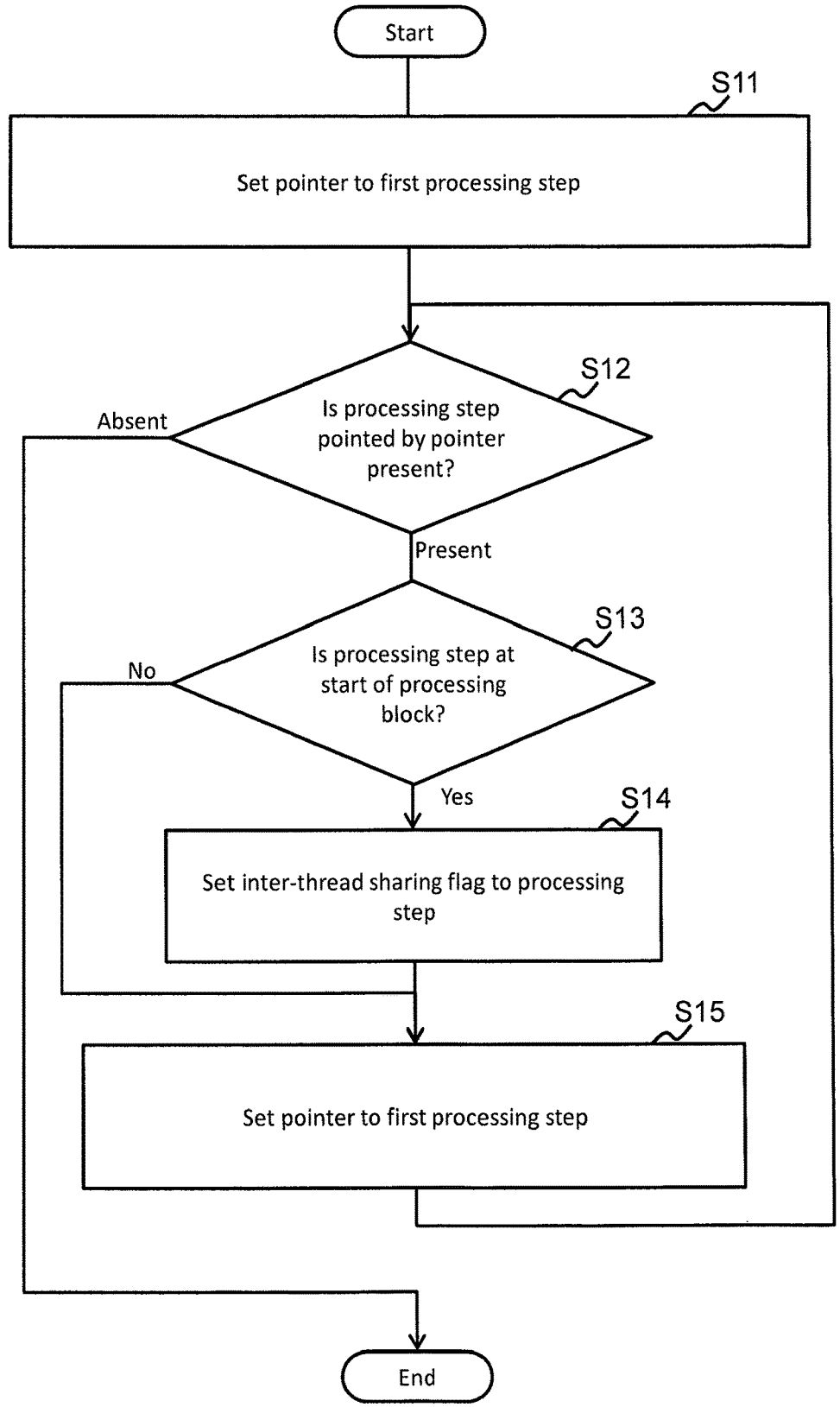
FIG. 22 is a flowchart of an inter-thread sharing flag setting processing according to Embodiment 1.

FIG. 22 is a flowchart of an inter-thread sharing flag setting processing according to Embodiment 1.

The inter-thread sharing flag setting processing is a processing corresponding to step S6 in the query execution plan generation processing shown in FIG. 21. The inter-thread sharing flag setting processing is a processing for setting, with respect to a predetermined processing step in the query execution plan, an inter-thread sharing flag showing that a context relating to the processing step should be shared between threads.

The query execution plan generation unit 143 performs processing while moving a pointer in order to trace the query execution plan having a tree structure. The pointer is set to the first processing step in the query execution plan (step S11). Next, the query execution plan generation unit 143 determines whether or not a processing step pointed by the pointer in the query execution plan is present (step S12). In the case where a processing step pointed by the pointer is absent as a result ("absent" in step S12), it means that processing has been performed for all intended processing steps in the query execution plan. Therefore, the query execution plan generation unit 143 terminates the inter-thread sharing flag setting processing. In the case where a processing step pointed by the pointer is present as a processing step in the query execution plan ("present" in step S12), the query execution plan generation unit 143 determines whether or not the processing step is at the start of a processing block (step S13).

In the case where one or more processing steps that have to be executed sequentially in a query execution plan are divided into sets that can be executed concurrently, a processing block refers to the set. For example, the query execution plan shown in FIG. 9 includes one processing block. A processing block will be described using another query execution plan.

Figure 23:
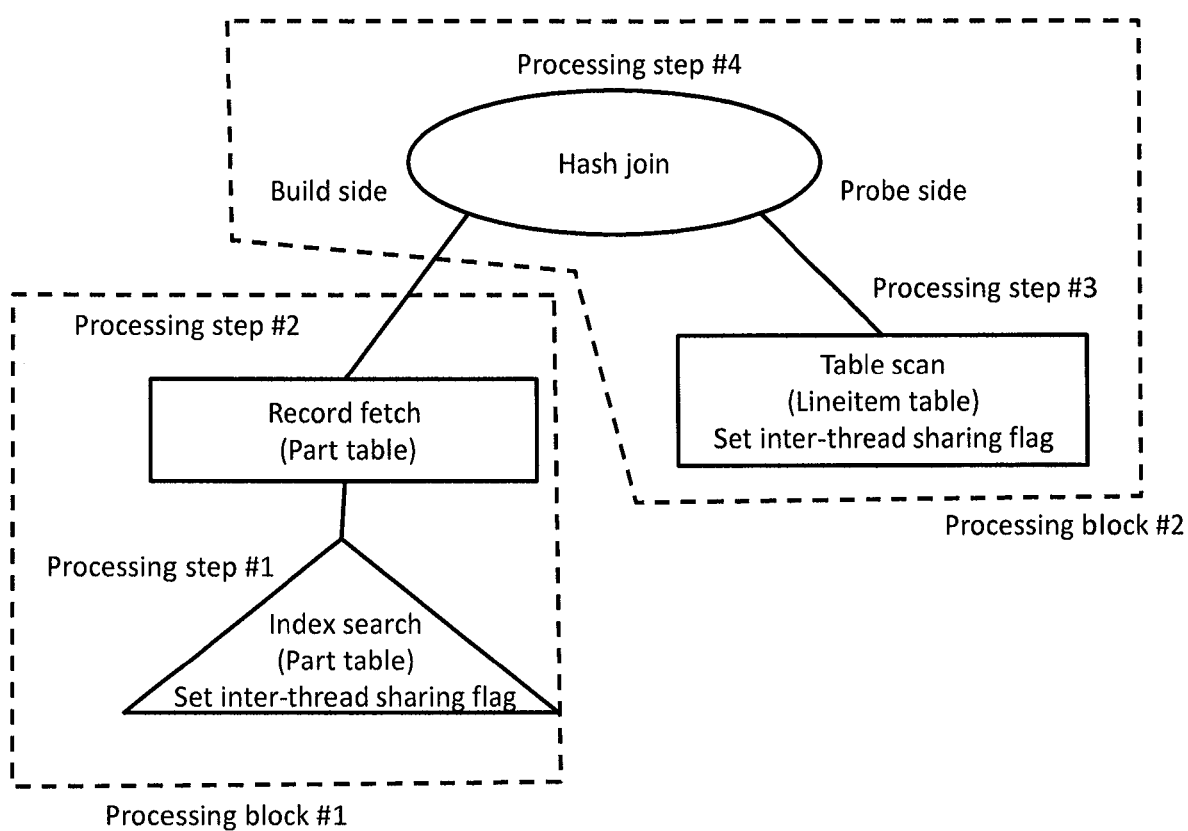
FIG. 23 is a view illustrating another example of a query execution plan according to Embodiment 1.

FIG. 23 is a view illustrating another example of a query execution plan according to Embodiment 1.

The query execution plan shown in FIG. 23 includes processing step #1 of performing an index search with a Part index, processing step #2 of acquiring a record from a Part table, processing step #3 of executing a table scan with respect to a Lineitem table, and processing step #4 of performing a hash join of the results of processing step #2 and processing step #3. Processing step #1 and processing step #2 are processing operations executable concurrently with processing step #3. The query execution plan includes processing block #1 including processing step #1 and processing step #2 and processing block #2 including processing step #3 and processing step #4. In the query execution plan, processing step #1 and processing step #3 are processing steps at the start of the processing block.

Aside from such a query execution plan, a query execution plan corresponding to a query including, for example, a subquery or a derived table also includes a plurality of processing blocks.

Returning to the description of FIG. 22, the query execution plan generation unit 143 sets an inter-thread sharing flag with respect to the processing step (step S14), in the case where the processing step is at the start of a processing block as a result of step S13 ("yes" in step S13). For example, in the query execution plan shown in FIG. 9, an inter-thread sharing flag is set to processing step #1. In the query execution plan shown in FIG. 23, an inter-thread sharing flag is set to processing step #1 and processing step #3. Then, processing proceeds to step S15. It is considered that a context should be shared by a plurality of threads in the case where a processing step is at the start of a processing block, so that tasks at a starting point are distributed to a plurality of threads at an early stage in the processing block.

In the case where the processing step is not at the start of the processing block as a result step S13 ("no" in step S13), the query execution plan generation unit 143 proceeds to a processing of step S15.

In step S15, the query execution plan generation unit 143 moves a pointer to the next processing step and proceeds to a processing of step S12.

In the inter-thread sharing flag setting processing shown in FIG. 22, an inter-thread sharing flag is set for a processing step at the start of a processing block. However, for example, an inter-thread sharing flag may be set for a processing step with a predetermined number or greater number of subsequent processing steps in a processing block.

Figure 24:
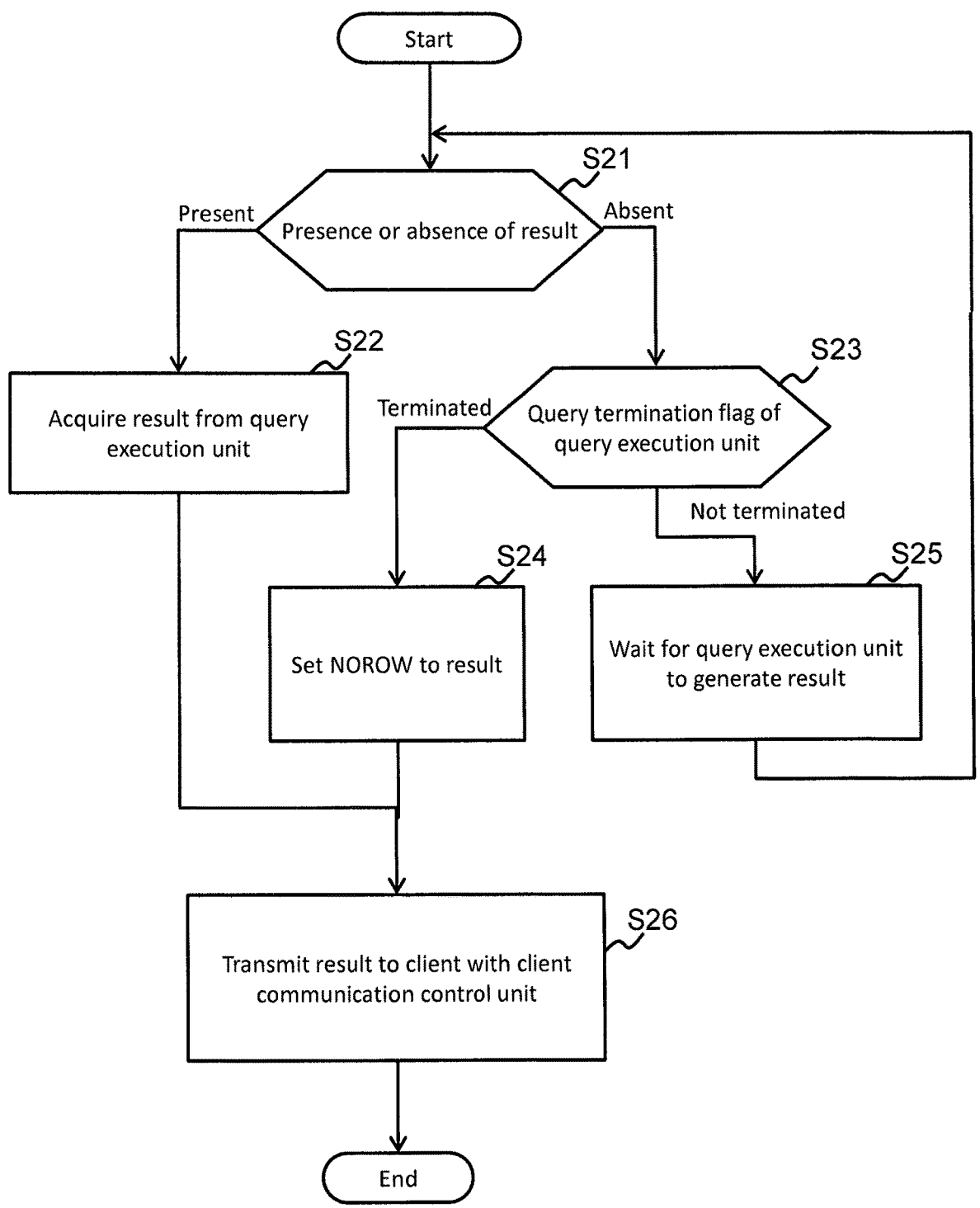
FIG. 24 is a flowchart of a result transmission processing according to Embodiment 1.

FIG. 24 is a flowchart of a result transmission processing according to Embodiment 1.

The result transmission processing is started by the client communication control unit 142 after the client communication control unit 142 has received a query. The client communication control unit 142 checks the presence or absence of a result of the received query in the query execution unit 144 (step S21).

In the case where a result of the query is present as a result ("present" in step S21), the client communication control unit 142 acquires the result of the query from the query execution unit 144 (step S22) and transmits the result of the query with respect to the AP 148 that is the issue source of the query (step S26).

In the case where a result of the query is absent ("absent" in step S21), the client communication control unit 142 determines whether a query termination flag of the query execution unit 144 is "terminated" showing termination of the query or "not terminated" showing that the query is not terminated (step S23). In the case where the query termination flag is "terminated" as a result ("terminated" in step S23), NOROW (no corresponding row) is set in the result (step S24), and the result of the query is transmitted with respect to the AP 148 that is the issue source of the query (step S26).

In the case where the query termination flag of the query execution unit 144 is "not terminated" showing non-termination of the query ("not terminated" in step S23), the client communication control unit 142 waits a predetermined time for the query execution unit 144 to generate a result (step S25) and proceeds to a processing of step S21.

Figure 25:
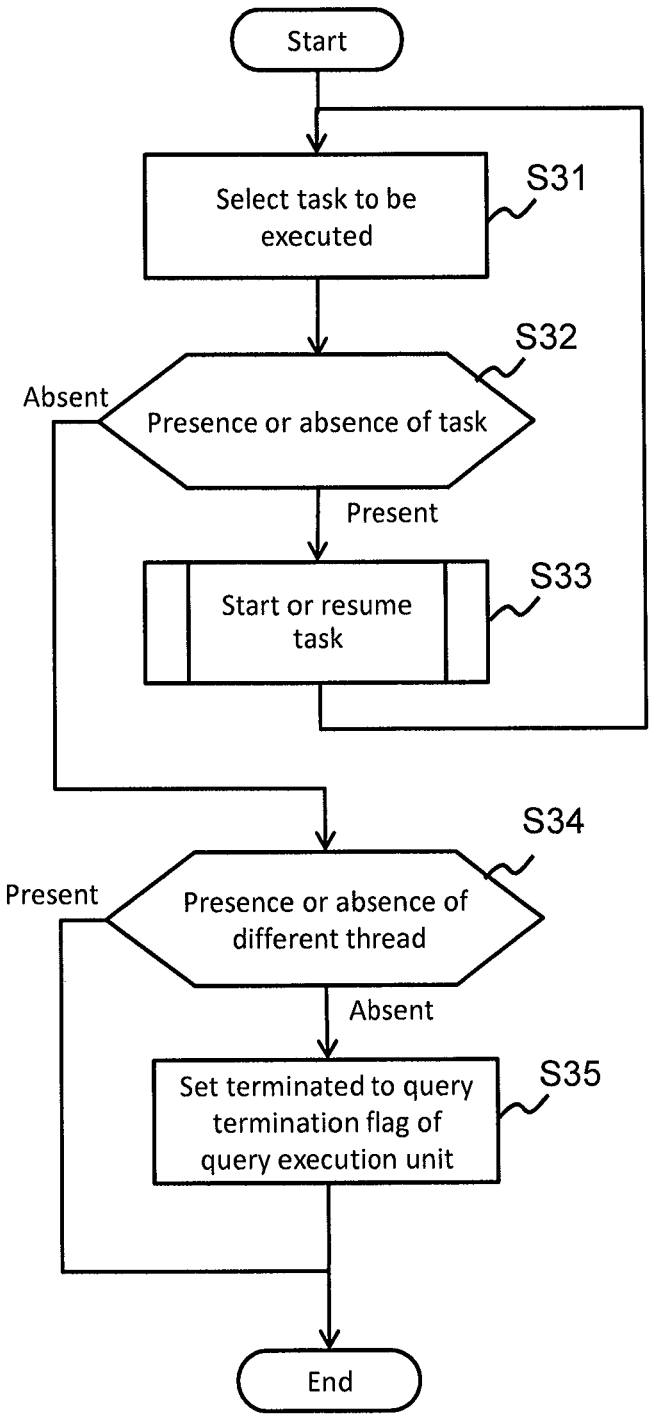
FIG. 25 is a flowchart of a thread execution processing according to Embodiment 1.

FIG. 25 is a flowchart of a thread execution processing according to Embodiment 1.

The thread execution processing is realized by a processor core of the processor 120 executing a thread generated in step S3 in FIG. 20. In the case where a plurality of threads exist, a different processor core can concurrently perform a thread execution processing with respect to a different thread, in the case where a plurality of threads exist.

A processor core selects a task to be executed in a corresponding thread (step S31). Specifically, the processor core selects a task included in a ready list of a thread corresponding to task management information managed by the execution task management unit 145.

Next, the processor core determines the presence or absence of a task to be executed (step S32). In the case where a task to be executed is absent ("absent" in step S32), processing proceeds to step S34. In the case where a task to be executed is present ("present" in step S32), the task is started or the task is resumed (step S33). Specifically, the following processing is performed. The processor core selects one task included in the ready list. The processor core checks task execution state information of the selected task and starts the task or resumes the task. In the case where a processing step of the task execution state information is not set, processing of the task is started. Specifically, a task execution processing (see FIG. 26) is executed. In the case where a processing step of the task execution state information is set, processing of the task is resumed. Specifically, execution is resumed from a processing of the task that has been interrupted. In this embodiment, processing is resumed from step S66 in FIG. 29. After the execution of the task has been terminated or after the execution of the task has turned to a waiting state, the processor core proceeds to a processing in step S31.

In step S34, the processor core checks the presence or absence of another thread (step S34). In the case where another thread is absent ("absent" in step S34), termination is set in a query termination flag of the query execution unit 144 (step S35), and the thread execution processing is terminated. Accordingly, the thread is destroyed. In the case where another thread is present ("present" in step S34), the processor core terminates the thread execution processing. Accordingly, the thread is destroyed.

Figure 26:
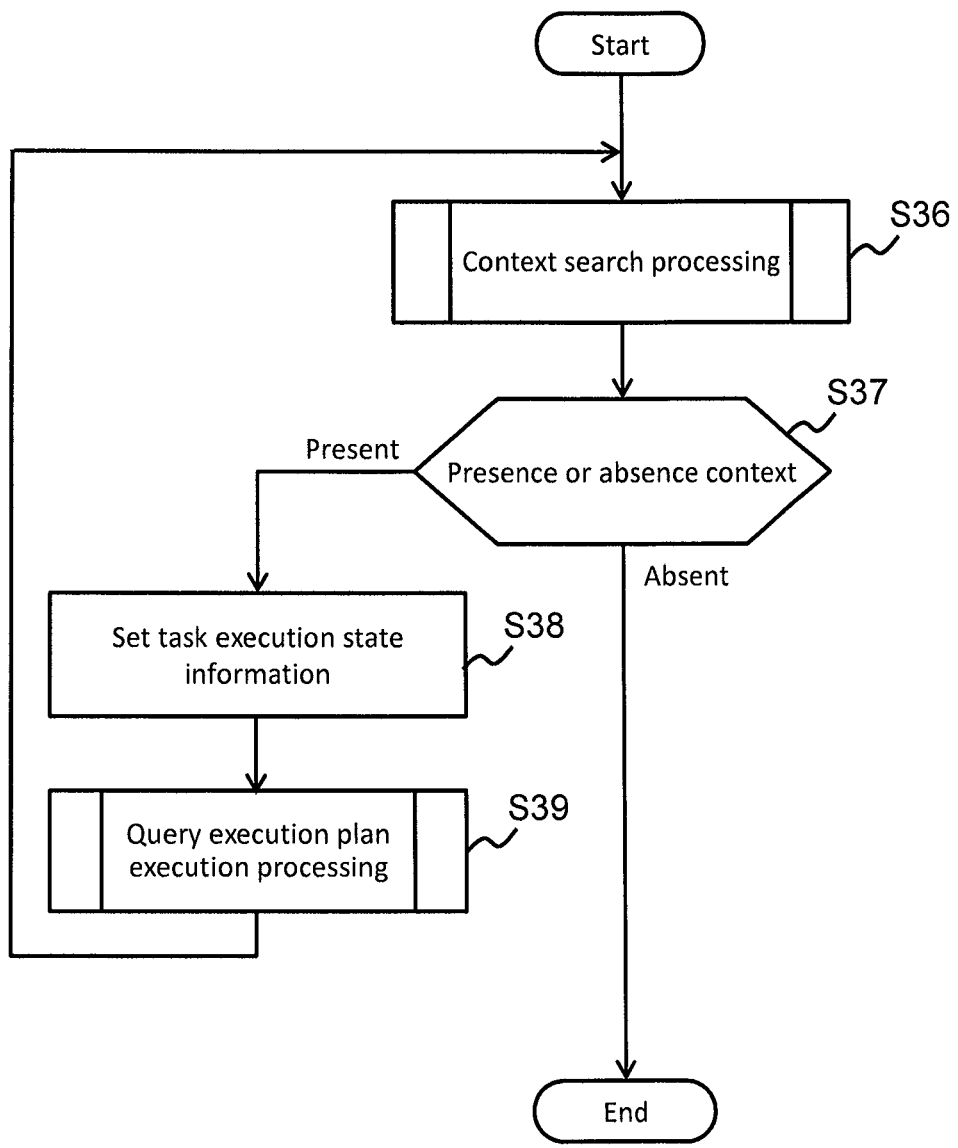
FIG. 26 is a flowchart of a task execution processing according to Embodiment 1.

FIG. 26 is a flowchart of a task execution processing according to Embodiment 1.

The task execution processing corresponds to a processing in the case where processing of a task is started in step S33 in FIG. 25. The task execution processing is realized by a processor core executing a task in a thread.

The processor core executes a context search processing (see FIG. 27) (step S36) and checks the presence or absence of a context retrieved by the context search processing (step S37). In the case where a context is absent as a result ("absent" in step S37), it means that an operation for a DB that should be executed is absent. Therefore, the task execution processing is terminated.

In the case where a context is present ("present" in step S37), the processor core sets the task execution state information 73 (see FIG. 11) of the task (step S38). Specifically, the processor core copies the value of the starting step 82a of the retrieved context 82 to the processing step 73b of the task execution state information 73. Data of a work area shown by a pointer of the intermediate result 82b of the context is copied to a work area shown by a pointer of the work area 73a of the task execution state information 73. Further, the processor core copies the value of the execution state 82c of the context 82 to the processing step execution state 73c of the task execution state information 73. For example, in the case of the context 82 shown in FIG. 19, the processing step execution state 73*c* of the task execution state information 73 stores the value "8" of the page number 820 of the context 82 as the page number, stores the value "2" of the slot number 821 of the context 82 as the slot number, and stores the value "2" of the processing row ID number 822 of the context 82 as the processing row ID number. Then, the processor core updates the execution state 82*c* of the context 82 to correspond to the processing content in the next task. For example, in the context 82 shown in FIG. 19, the value of the processing row ID number 822 is incremented by one to "3."

The task execution state information 73 shown in FIG. 19 that is set in this manner indicates that a row ID with the processing row ID number "2" for the slot number "2" in a page (page P8 in FIG. 7) with the page number "8" is referenced in the processing of the task. As a result, in the processing thereafter, the task starts processing from referencing of a record (record having id132) storing the slot number "1" in page "P120" shown by the corresponding row ID.

Figure 28:
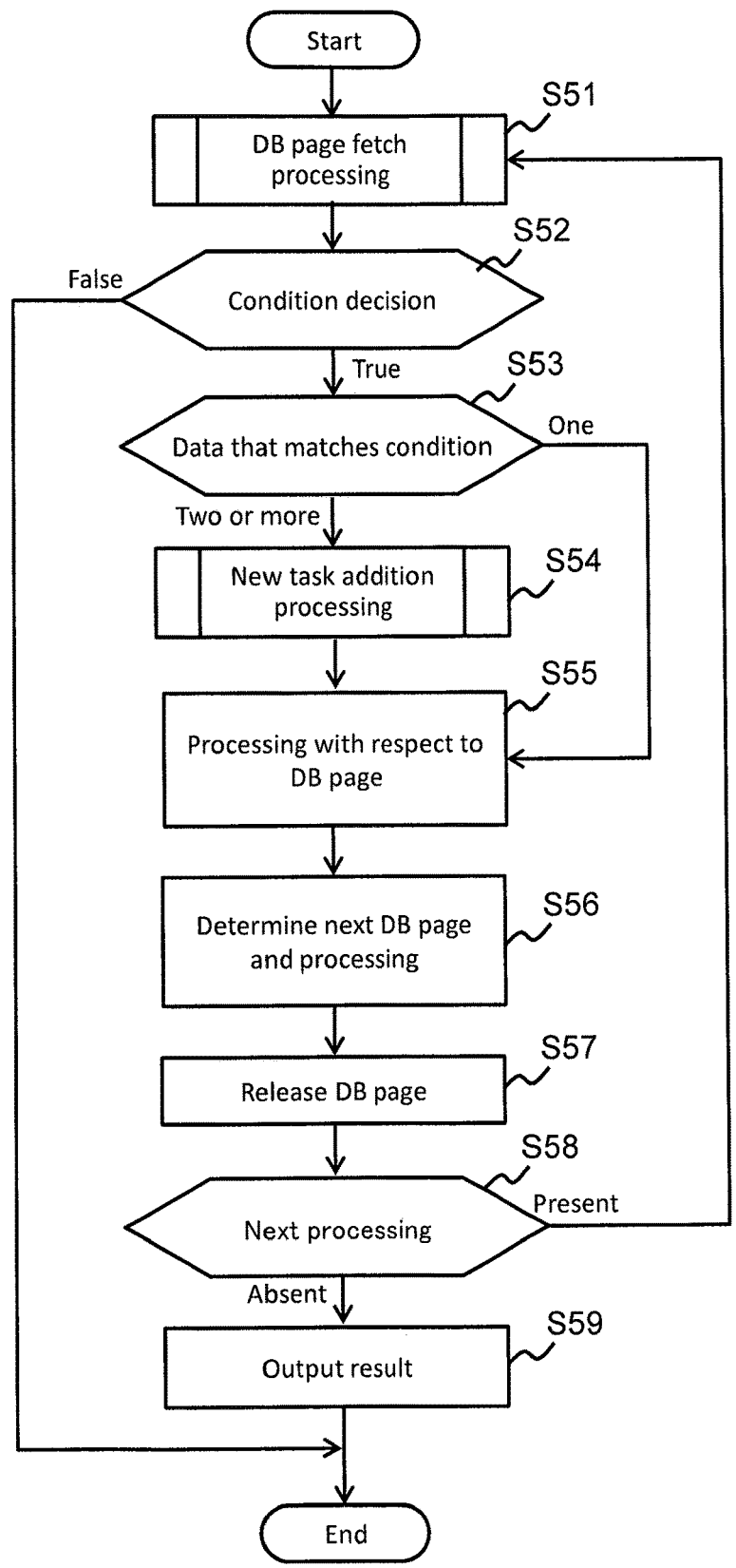
FIG. 28 is a flowchart of a query execution plan execution processing according to Embodiment 1.

After step S38, the processor core executes a query execution plan execution processing (see FIG. 28). In the case where processing of the task has been terminated, step S39 is terminated, and the processing proceeds to step S36.

Figure 27:
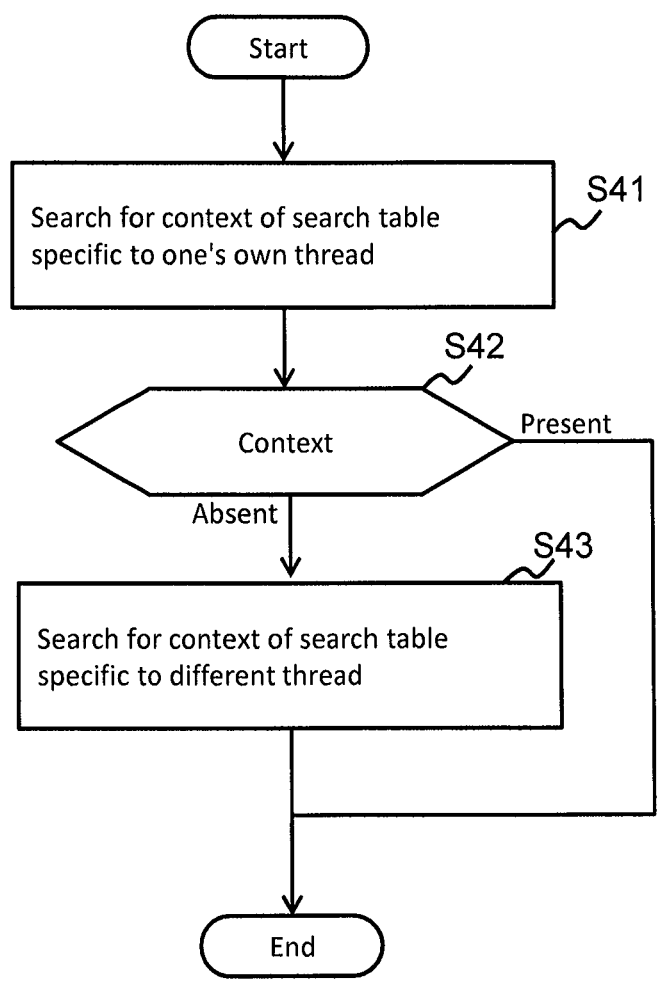
FIG. 27 is a flowchart of a context search processing according to Embodiment 1.

FIG. 27 is a flowchart of a context search processing according to Embodiment 1.

The context search processing is a processing corresponding to step S36 in FIG. 26. A processor core searches for a context, using a pointer of a thread specific search table (83, 84, or 85) specific to a thread being executed (one's own thread) (step S41). In this embodiment, the processor core searches for a context in order from the last processing step to the first processing step. Next, the processor core checks the presence or absence of a retrieved context (step S42). In the case where a context has been found as a result ("present" in step S42), the context search processing is terminated. In the case where a context is absent ("absent" in step S42), it means that there is a possibility of the number of available contexts being uneven between threads. Therefore, a context is searched for using a pointer of a thread specific search table specific to a thread (another thread) other than one's own thread (step S43). In the case where a context is to be acquired from a thread specific search table specific to a another thread in this embodiment, the processor core searches for the context in order from the first processing step to the last processing step. The context is searched for from the first processing step, because there is a high possibility of the number of generated tasks being greater for that closer to the first processing step, and thus load can be distributed to respective threads at an early stage. After step S43, the processor core terminates the context search processing.

For example, in the case where the context search processing is executed with thread #1, thread #1 searches for a context with the thread #1 specific search table. Search by thread #1 is in order from processing step #4 to processing step #1 in the thread #1 specific search table. In the state of FIG. 16, thread #1 finds the pointer to context #2 and uses context #2. In the case where context #2 has become absent, the pointer to context #1 is found, and context #1 is used. Further, in the case where context #1 has become absent, the thread #1 search table is in a state where an available context is absent, and thread #1 searches for a context with a search table specific to a thread other than one's own thread. In this case, search is in order from processing step #1 to processing step #4. Search by thread #1 is in the order of processing step #1 of the thread #2 specific search table, processing step #1 of the thread #3 specific search table, processing step #2 of the thread #2 specific search table, processing step #2 of the thread #3 specific search table, processing step #3 of the thread #2 specific search table, processing step #3 of the thread #3 specific search table, processing step #4 of the thread #2 specific search table, and processing step #4 of the thread #3 specific search table. In the case where the pointer to context #1 in FIG. 17 and FIG. 18 is absent, thread #1 finds the pointer to context #3 with the thread #2 specific search table and uses context #3.

In the context search processing described above, a thread specific search table specific to another thread is referenced to search for a context, in the case where a context is absent, i.e., in the case where there are zero contexts. However for example, a thread specific search table specific to another thread may be referenced to search for a context, in the case where there are less than or equal to a predetermined number of contexts.

With step S43 of the context search processing described above, unevenness in load between threads can be reduced based on the number of contexts available to respective threads. However, other than such a processing, there may be an adjustment by a light distribution thread shown in a modified example (see FIG. 34) described later.

FIG. 28 is a flowchart of a query execution plan execution processing according to Embodiment 1.

The query execution plan execution processing corresponds to step S39 in FIG. 26. The query execution plan execution processing is realized by a processor core executing a task assigned to a thread. A logical functional unit that executes the query execution plan execution processing corresponds to the query execution plan execution unit 151.

The processor core acquires a page in the DB 206 by executing a DB page fetch processing (see FIG. 29) (step S51). Next, the processor core determines, as true or false, whether data in the page that matches the search condition is present (step S52). An example is a search processing within a higher-level page for a higher-level page of an index or a search processing of a leaf page for a leaf page. In the case where data that matches the search condition is absent within data in the page as a result ("false" in step S52), a processor terminates the query execution plan execution processing.

In the case where data that matches the search condition is present ("true" in step S52), the processor core determines whether one piece or two or more pieces of data that match the search condition are present (step S53). In the case where one data that matches the search condition is present as a result ("one" in step S53), the processor core proceeds to a processing of step S55. In the case where two or more pieces of data that match the search condition are present ("two or more" in step S53), the processor core executes a new task addition processing (see FIG. 30) (step S54) and proceeds to a processing of step S55.

In step S55, the processor core executes a processing with respect to a page of a DB in a processing step by the task. A processing with respect to a page of a DB is, for example, a processing of reading a page number that matches the search condition for a higher-level page of an index, a processing of reading a row ID that matches the search condition for a leaf page, or a processing of reading a column of a record for page of a table.

Next, the processor core determines the next page of the DB and a processing with respect to the DB page (step S56) and proceeds to a processing of step S57.

In step S57, the processor core releases the acquired DB page. Next, in step S58, the processor core determines whether or not the next processing is present. Specifically, in the case where a processing step currently performed is completed and the next processing step is absent in a processing block including the processing step, it is determined as "absent." In the case where the next processing step is present as a result ("present" in step S58), the processor core proceeds to a processing of step S51. In the case where the next processing is absent ("absent" in step S58), the processing result is passed to the query execution unit 144 (step S59), and the query execution plan execution processing is terminated.

Determination of the next DB page and the processing with respect to the DB page will be described with an example of a case where an index search of the Part table is performed with c1=130 as the search condition with respect to the DB 206 shown in FIG. 4 to FIG. 7.

In the case where the index search is being started for the first time, the processor core determines a root page (page with the page number "P1") of an index as the next DB page, determines a search processing within a higher-level page to search for a key of "130" with respect to the page as a processing with respect to the DB page, and starts the processing. The processor core reads page P1 in step S51 and searches for an entry including c1 "130" within the page P1 in step S52. One entry including c1 "200" is to be found. Therefore, in step S55 and step S56, a search processing within a higher-level page with respect to page P3 that is the next processing is determined as a processing with respect to a DB page. In step S51 to step S55, a processing with respect to page P3 is performed. The processor core reads page P3, searches for an entry including c1 "130" in the page P3, and finds a pointer to page P8 in the entry including c1 "130." As a result, page P8 is determined as the next DB page, and a search processing within a leaf page with respect to the page P8 is determined as a processing with respect to a DB page.

In step S51 to step S53, the processor core reads page P8, searches for an entry including c1 "130" in the page P8, and finds the page "P100" of the Part table and the slot number "2." Since there are three pieces of data that match the condition, the new task addition processing (step S54) is performed in order to perform processing of two pieces of data other than data processed in the task. In this embodiment, data processed in the task is assumed as first data, page P100 of the Part table is determined as the next DB page in step S56, and a processing of acquiring a record for the slot number 2 with respect to the page P100 is determined as a processing with respect to a DB page.

Figure 29:
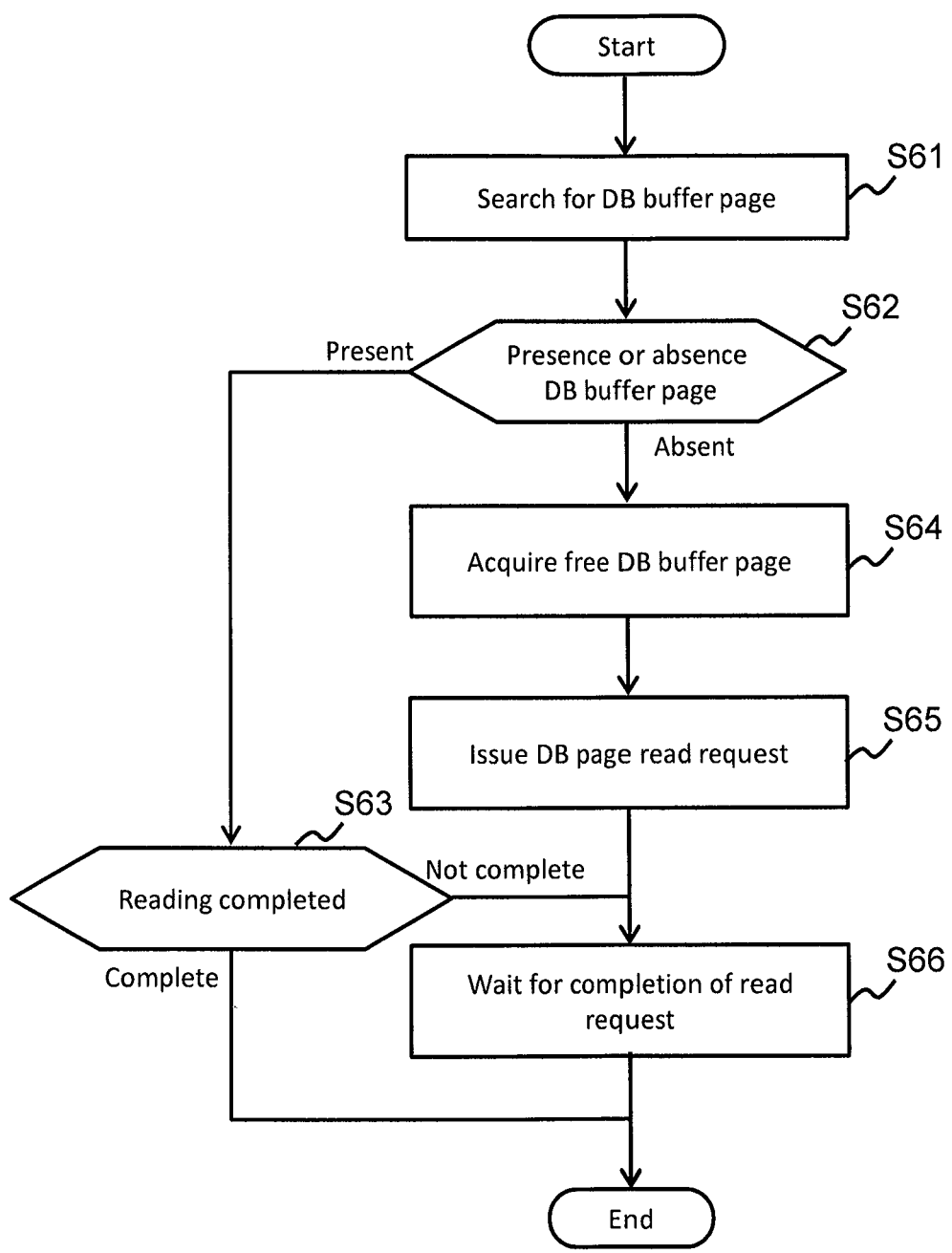
FIG. 29 is a flowchart of a DB page fetch processing according to Embodiment 1.

FIG. 29 is a flowchart of a DB page fetch processing according to Embodiment 1.

The DB page fetch processing corresponds to step S51 of the query execution plan execution processing (FIG. 28). The DB page fetch processing is realized by a processor core executing a task assigned to a thread.

The processor core searches for a buffer page (DB buffer page) corresponding to a DB page of a fetch target in the DB buffer management unit 147 (step S61) and checks the presence or absence of the corresponding DB buffer page (step S62).

In the case where the corresponding DB buffer page is present as a result ("present in step S62), the processor core determines whether or not reading of the page from the DB 206 is completed (step S63). In the case where reading is completed ("complete" in step S63), the DB page fetch processing is terminated. In the case where reading is not completed ("not complete" in step S63), processing proceeds to step S66.

In the case where the corresponding DB buffer page is absent ("absent" in step S62), the processor core acquires a free DB buffer page from the DB buffer management unit 147 (step S64), issues a DB page read request with respect to the DB 206 for reading the corresponding page into the free DB buffer page (step S65), and proceeds to a processing of step S66.

In step S66, the processor core waits for reading of the page to be completed. The processor core may employ a scheme of executing another processing even if reading of a page is not completed, i.e., asynchronous I/O, without employing a scheme of waiting until reading of a page is completed, i.e., synchronous I/O. For example, the processor core interrupts processing of a task being executed to cause a waiting state and reattaches task execution state information to a waiting list. Completion of reading of a corresponding page is checked by a different thread (or different task). In the case where the different thread (processor core executing the different thread) has checked completion of reading of the page, the task execution state information of the task may be reattached to a ready list to resume processing of the task. In this manner, employing asynchronous I/O enables the processor core to perform execution of another task without waiting for completion of reading of the page and allows processing efficiency in the DBMS 141 to be improved. In the case where reading has been completed, the processor core terminates the DB page fetch processing.

Figure 30:
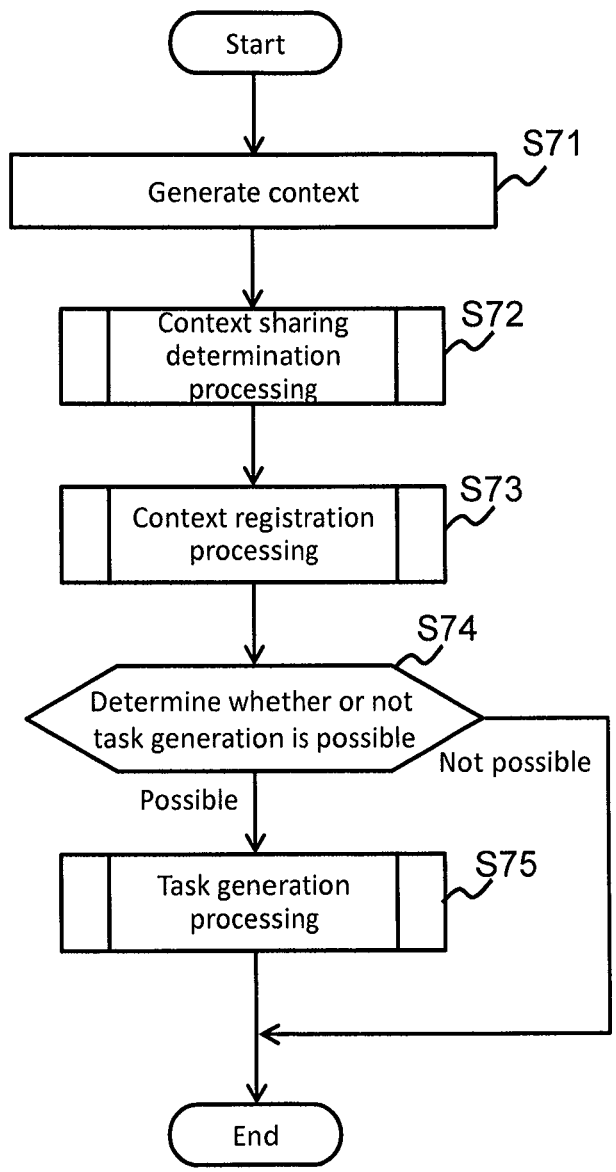
FIG. 30 is a flowchart of a new task addition processing according to Embodiment 1.

FIG. 30 is a flowchart of a new task addition processing according to Embodiment 1.

The new task addition processing corresponds to step S54 of the query execution plan execution processing (FIG. 28). The new task addition processing is intended and executed for data other than one data (e.g., first data) within matching data, in the case where two or more pieces of data that match the condition are present in step S53.

The processor core creates the context 82 based on data of a processing target (step S71). Next, the processor core executes a context sharing determination processing (see FIG. 31) for determining whether or not the created context 82 is to be shared between threads (step S72). Next, the processor core executes a context registration processing (see FIG. 32) of registering the created context 82 in the context management information 80 (step S73).

Next, the processor core determines whether or not generating a new task is possible (step S74). Whether or not generating a new task is possible can be determined by, for example, determining whether or not the number of generated tasks in the DBMS 141 has reached an upper limit value of the number of tasks up to which generation is possible.

In the case where task generation is possible as a result ("possible" in step S74), the processor core executes a task generation processing (see FIG. 33) for generating a new task (step S75) and terminates the new task addition processing. In the case where task generation is not possible ("not possible" in step S74), the new task addition processing is terminated without generating a task.

Figure 31:
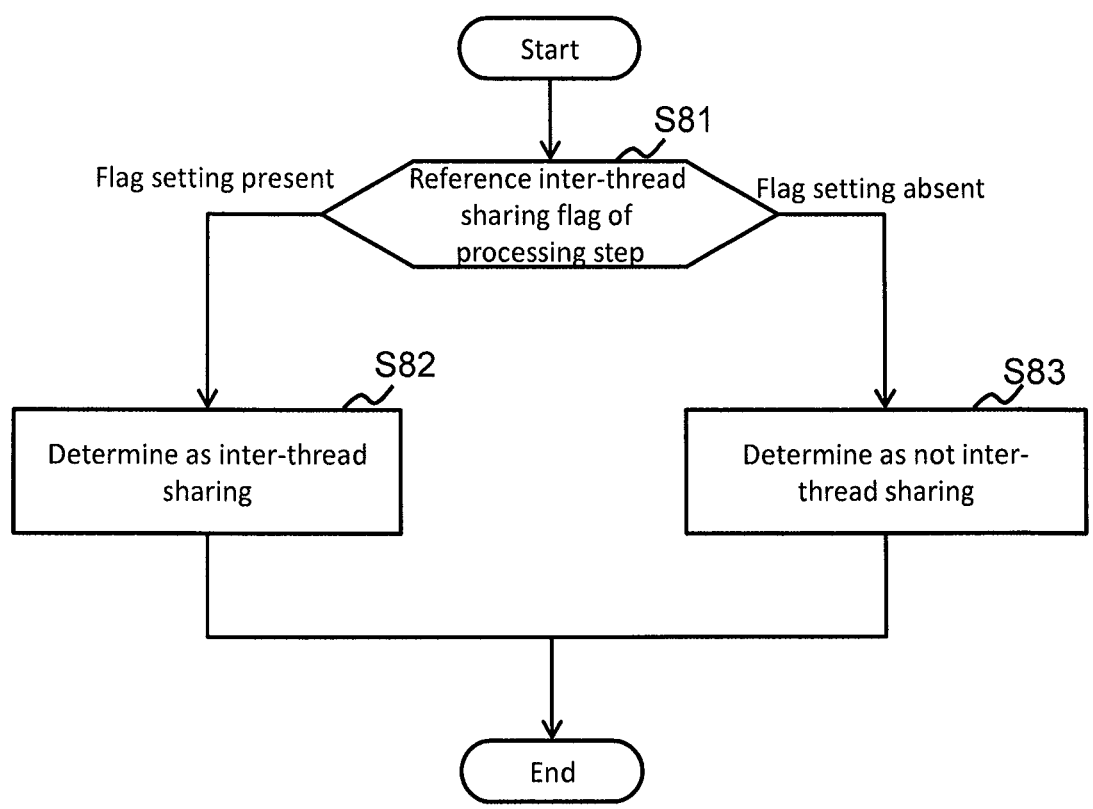
FIG. 31 is a flowchart of a context sharing determination processing according to Embodiment 1.

FIG. 31 is a flowchart of a context sharing determination processing according to Embodiment 1.

The context sharing determination processing corresponds to step S72 of the new task addition processing (FIG. 30). The context sharing determination processing is realized by a processor core executing a task assigned to a thread.

The processor core references an inter-thread sharing flag of a processing step relating to the generated context (step S81). In the case where the inter-thread sharing flag is set to the processing step as a result ("flag setting present" in step S81), it is determined by the processor core as inter-thread sharing in which the context is made available to a plurality of threads (step S82) and terminates the context sharing determination processing. In the case where the inter-thread sharing flag is not set to the processing step ("flag setting absent" in step S81), it is determined by the processor core as not inter-thread sharing in which the context is made available to one thread (step S83), and the context sharing determination processing is terminated.

In the context sharing determination processing, whether or not the generated context is to be shared between threads is determined based on the inter-thread sharing flag. However, this is not limiting. For example, the processor core may determine whether or not the generated context is to be shared between threads based on the execution state of the DBMS 141.

For example, as the execution state of the DBMS 141, the number of currently existing tasks of the DBMS 141 is employed. It may be such that the processor core determines the generated context is to be shared between threads in the case where the number of currently existing tasks is less than or equal to a predetermined number and determines the generated context to be not shared between threads in the case where the number of currently existing tasks is not less than or equal to the predetermined number.

It may be such that the intermediate result 82b included in a context is employed as the execution state of a DBMS, and the processor core determines the generated context is to be shared between threads in the case where the data volume of the intermediate result 82b included in the context is less than or equal to a predetermined volume and determines the generated context to be not shared between threads in the case where the data volume of the intermediate result 82b included in the context is not less than or equal to the predetermined volume.

Figure 32:
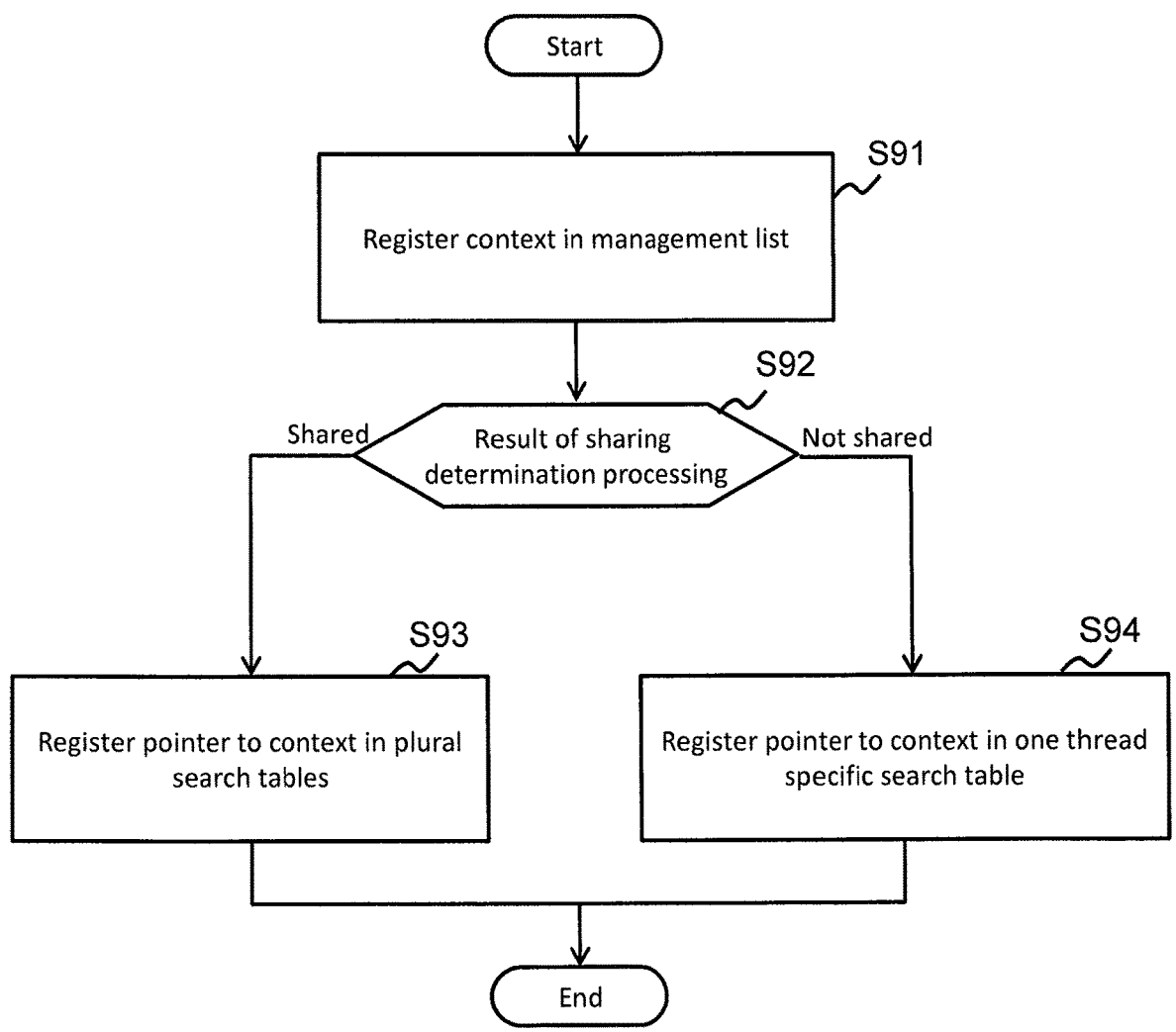
FIG. 32 is a flowchart of a context registration processing according to Embodiment 1.

FIG. 32 is a flowchart of a context registration processing according to Embodiment 1.

The context registration processing corresponds to step S73 of the new task addition processing (FIG. 30). The context registration processing is realized by a processor core executing a task assigned to a thread.

The processor core registers a created context in a management list of the context management information 80 (step S91). Specifically, the processor core connects the created context behind the last context coupled to the management list.

Next, the processor core checks the result of the context sharing determination processing (see FIG. 31) (step S92). In the case where the result is inter-thread sharing as a result ("shared" in step S92), a pointer to the created context is registered in a plurality of thread specific search tables, and the context registration processing is terminated. In this embodiment, a pointer to the context is registered in all search tables specific to a thread that executes a DB access processing (step S93). In addition, a pointer to the context may be registered in a particular thread specific search table.

A case of registering a pointer to the context in a particular thread specific search table will be described. For example, a thread specific search table for registration is specified based on hardware configuration information of a computer. For the hardware configuration information, a processor configuration, a cache configuration, or a memory configuration is conceivable. For example, in a plurality of threads executed by a plurality of processor cores in one processor, registration is performed in a thread specific management table specific to a thread corresponding to the plurality of threads with the smallest total of the task generable number of an available context. In this embodiment, consider a situation where a processor core executing thread #2 and a processor core executing thread #3 are of the same processor, the processor differs from a processor executing thread #1, and a pointer to context #1 is registered in the thread specific search table of thread #2 and the thread specific search table of thread #3. In the case where new context #4 with respect to processing step #1 is generated, registration is performed in a search table specific to a thread thread executed by a processor core of the processor with fewer contexts. In this case, registration is performed in the thread specific search table of thread #1. In this example, registration is performed in one thread specific search table. However, in the case where a processor with a processor core executing thread #1 is also executing a thread that executes the DB access processing, registration is performed in a plurality of thread specific search tables.

Alternatively, registration may be performed in a thread specific management table specific to a thread corresponding to a plurality of threads corresponding to a processor including a processor core that has generated a context. In a plurality of threads executed by a plurality of processor cores in one processor, registration may be performed in a thread specific management table specific to a thread corresponding to the plurality of threads with a small total of available contexts. Registration may be performed in a thread specific management table of a plurality of threads executed by a processor core sharing a cache within a processor. Registration may be performed in a thread specific management table of a plurality of threads executed by a processor core close to a memory in which a context is recorded. Registration may be performed in a thread specific management table of a plurality of threads executed by a processor core close to a memory in which a DB buffer page referenced upon use of a context is recorded.

In the case where the result is not inter-thread sharing ("not shared" in step S92), the processor core registers a pointer to one thread specific search table and terminates the context registration processing. In this embodiment, a pointer to the created context is registered in a thread specific search table specific to a thread (one's own thread) executed by itself (step S94) and terminates the context registration processing. Alternatively, registration may be performed in a thread specific search table with the fewest available contexts, or registration may be performed in a thread specific search table with the smallest total of task generable number of an available context.

Figure 33:
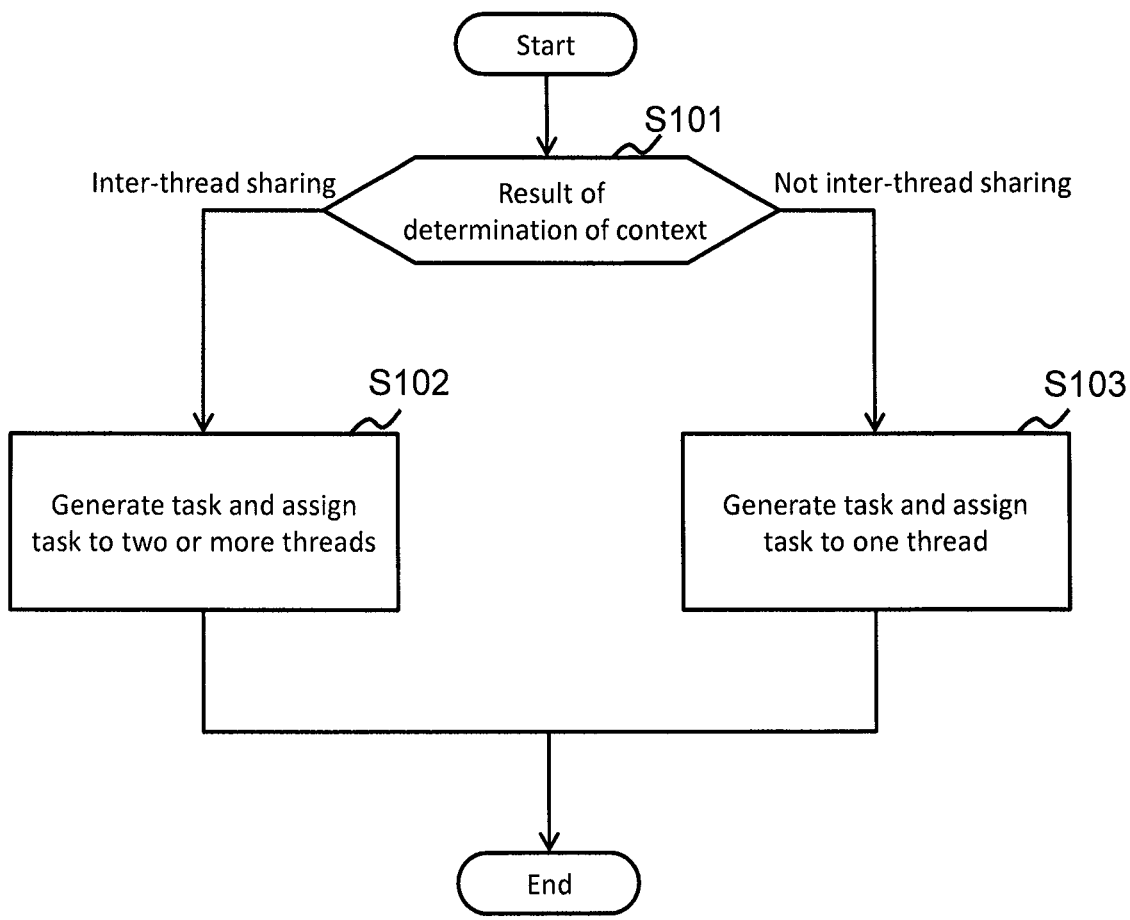
FIG. 33 is a flowchart of a task generation processing according to Embodiment 1.

FIG. 33 is a flowchart of a task generation processing according to Embodiment 1.

The task generation processing corresponds to step S75 of the new task addition processing (FIG. 30). The task generation processing is realized by a processor core executing a task assigned to a thread.

Next, the processor core checks the result of the context sharing determination processing (see FIG. 31) (step S101). In the case where the result is inter-thread sharing ("inter-thread sharing" in step S101), the processor core generates a task and assigns the task to two or more threads corresponding to a thread specific search table in which a pointer of a context is registered (step S102). The upper limit of the total of tasks to be generated is the generable number for a context. The number of tasks assigned to each thread is a number obtained by dividing the generable number for the context by the number of threads. Then, the processor core terminates the task generation processing.

In the case where the result is not inter-thread sharing ("not inter-thread sharing" in step S101), the processor core generates a task and assigns the task to one thread corresponding to a thread specific search table in which a pointer of a context is registered (step S103). The upper limit of the number of tasks to be generated is the generable number for a context. A thread to which a task is assigned may be one's own thread executed by the processor core or may be a thread other than one's own thread. After step S103, the processor core terminates the task generation processing.

Next, a modified example of this embodiment will be described.

In the embodiment described above, the query execution unit 144 may execute a load balance processing shown below.

Figure 34:
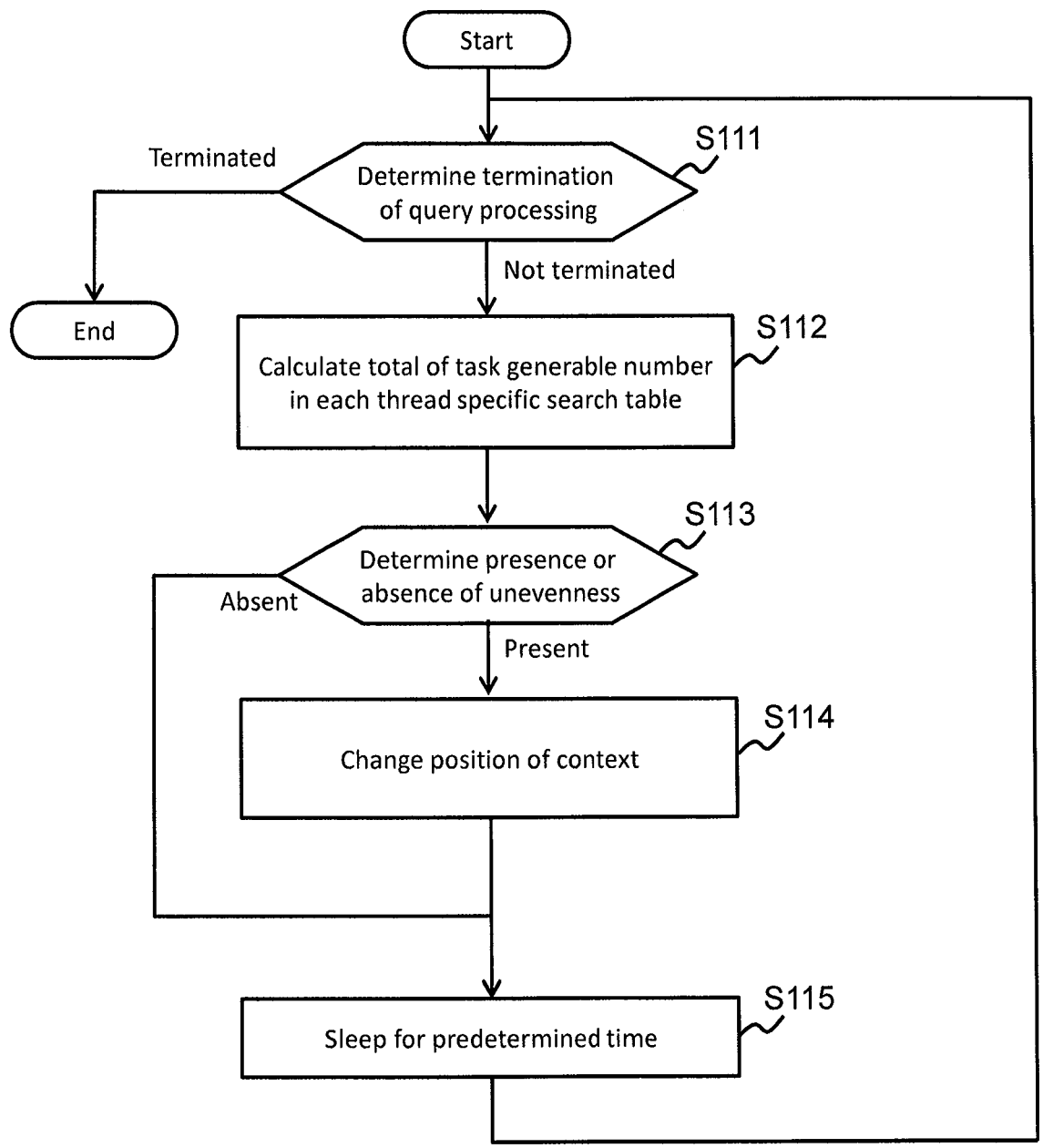
FIG. 34 is a flowchart of a load balance processing according to a modified example.

FIG. 34 is a flowchart of the load balance processing according to the modified example.

The load balance processing is executed by the query execution unit 144 and is specifically realized by a processor core executing a thread (light distribution thread) other than a thread for performing a DB processing. The load balance processing is started after the client communication control unit 142 has received a query.

The processor core determines whether or not a query processing has been terminated (step S111). In the case where the query processing has been terminated ("terminated" in step S111), the load balance processing is terminated.

In the case where the query processing has not been terminated ("not terminated" in step S111), the processor core calculates the total of the task generable number in an available context from each thread specific search table (step S112).

Next, the processor core determines whether or not unevenness is present in the total of the task generable number up to which generation is possible by each thread (step S113). The processor core may determine that unevenness is present in the case where the task generable number is less than or equal to a predetermined number (e.g., zero), for example.

In the case where unevenness is absent in the total of the task generable number up to which generation is possible by each thread as a result ("absent" in step S113), processing proceeds to step S115.

In the case where unevenness is present in the total of the task generable number up to which generation is possible by each thread ("present" in step S113), the processor core reduces the unevenness in the total of the task generable number up to which generation is possible by each thread, by changing the position of a context, i.e., changing a thread specific search table storing a pointer with which a context is referenced to a different thread specific search table. Specifically, a pointer of a context made available by a thread specific search table specific to a thread with the largest total of the task generable number is registered in a thread specific search table specific to a thread with a small total of the task generable number. Then, the processor core proceeds to a processing of step S115.

In step S115, the processor core causes the load balance processing to sleep for a predetermined time and proceeds to a processing of step S111.

With the load balance processing, load with respect to respective threads can be distributed appropriately.

In the load balance processing described above, change of a thread that uses a context is performed based on unevenness in the total of the task generable number up to which generation is possible by each thread. However, it may be such that the load of a thread is kept track of and a thread that uses a context is changed based on the execution state relating to a thread, other than unevenness of the total of the task generable number. For example, it may be such that a cost calculation for each thread is performed, and a thread that uses a context is changed based on the cost. As an example of the cost calculation, the following value is conceivable. The cost of a context is assumed from the context as a product of the number of processing steps to be processed and the task generable number, and the total of cost of an available context is assumed from the thread as the cost of the thread.

The load balance processing may be executed by a thread for performing a DB processing. For example, execution may be at the time of termination of a thread (in the case where it is determined as "absent" in step S32) or at the time of termination of a task (in the case where it is determined as "absent" in step S37). In this case, the load balance processing is executed from step S112 to step S114.

Embodiment 2

Embodiment 2 will be described below. Differences from Embodiment 1 will be mainly described, and description on points common with Embodiment 1 will be omitted or simplified.

Figure 35:
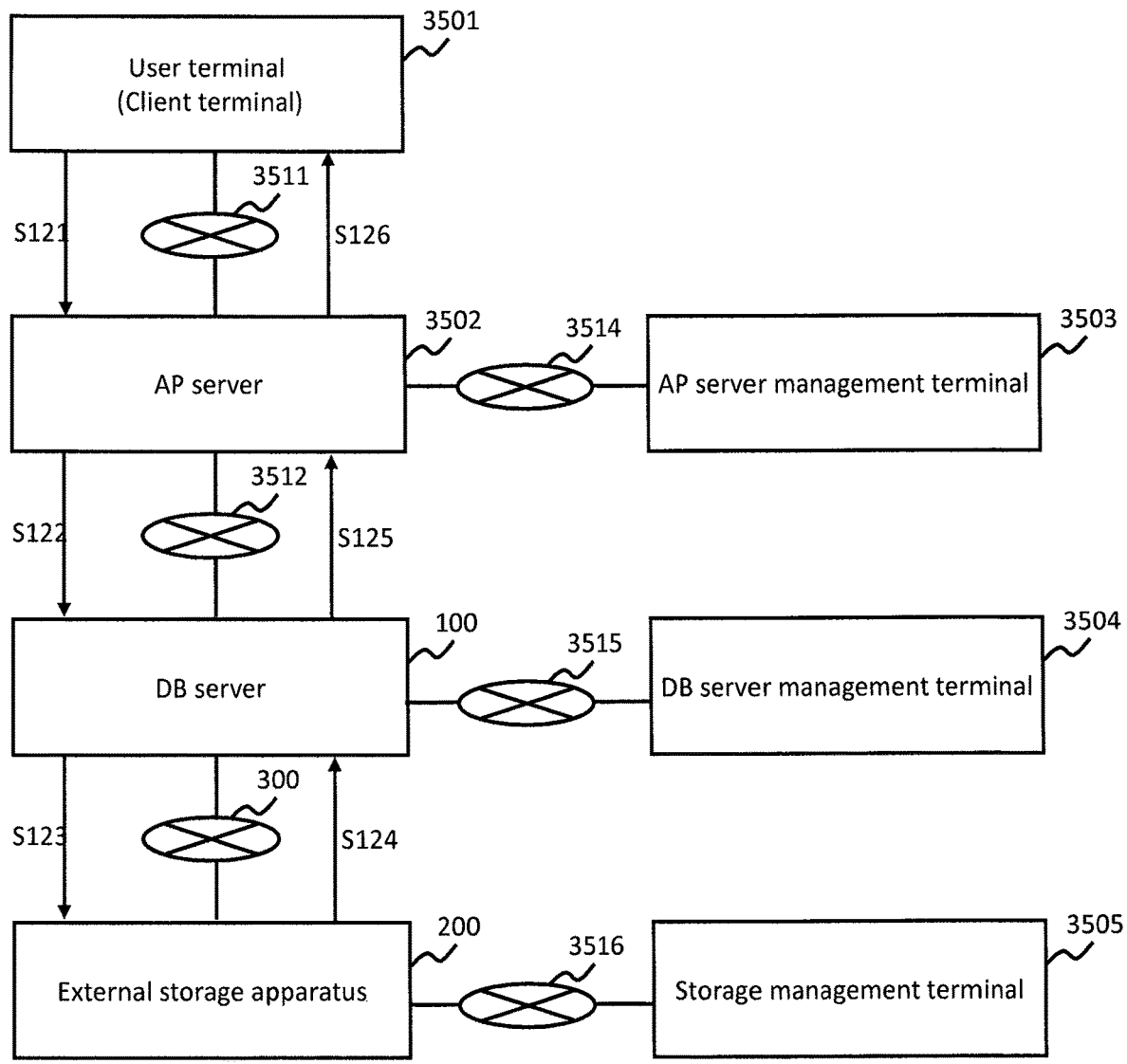
FIG. 35 shows the configuration of a computer system according to Embodiment 2.

FIG. 35 shows the configuration of a computer system according to Embodiment 2.

An application server (AP server) 3502 is connected, so as to be capable of communication via a communication network 3512, to the computer (hereinafter, DB server) 100 on which the DBMS 141 runs. The DB server 100 is coupled to the external storage apparatus 200 be capable of communication via the communication network 300. A user terminal (client terminal) 3501 is coupled to the AP server 3502 to be capable of communication via a communication network 3511. The DB server 100 executes the DBMS 141 that manages the DB 206. The external storage apparatus 200 stores the DB 206. The AP server 3502 executes an AP that issues a query with respect to the DBMS 141 executed by the DB server 100. The user terminal 3501 makes a request to an AP executed by the AP server 3502. Multiple user terminals 3501 or the AP servers 3502 may exist.

An AP server management terminal 3503 is coupled to the AP server 3502 via a communication network 3514. A DB server management terminal 3504 is coupled to the DB server 100 via a communication network 3515. A storage management terminal 3505 is coupled to the external storage apparatus 200 via a communication network 3516. The AP server management terminal 3503 is a terminal that manages the AP server 3502. The DB server management terminal 3504 is a terminal that manages the DB server 100. The storage management terminal 3505 is a terminal that manages the external storage apparatus 200. A DB server administrator or user may perform setting relating to the DBMS 141 from the DB server management terminal 3504. At least two of the management terminals 3503 to 3505 may be common (integrated). At least two of the communication networks 3511, 3512, 3514, 3515, 3516, and 300 may be common (integrated).

In Embodiment 2, processing is executed in the following manner, for example.

(S121) The user terminal 3501 issues a request (hereinafter, user request) to the AP server 3502.

(S122) The AP server 3502 generates a query according to the user request received in S121. The generated query is issued to the DB server 100.

(S123) The DB server 100 accepts the query from the AP server 3502 and executes the received query. The DB server 100 issues a data input-output request (e.g., data read request) necessary in the execution of the received query to the external storage apparatus 200. In the execution of one query, the DB server 100 may concurrently issue a plurality of data input-output requests. Therefore, the DB server 100 may concurrently perform a request of S123 a plurality of times in the execution of one query.

(S124) The external storage apparatus 200 responds to the DB server 100 regarding the data input-output request issued in S123. The external storage apparatus 200 may concurrently perform a response of S124 a plurality of times.

(S125) The DB server 100 generates and transmits, to the AP server 3502, an execution result of the query.

(S126) The AP server 3502 transmits the execution result of the query. A reply with respect to the user request received in S121 according to the execution result is transmitted to the user terminal 3501.

There may be a plurality of simultaneous user requests issued to the AP server 3502 or queries issued to the DB server.

The descriptions above are based on the embodiments. However, the present invention is not limited to the embodiments described above, and applications to other various forms are possible.

REFERENCE SIGNS LIST

141 Database management system (DBMS)

What is claimed is:

1. A database management system being realized by a computer including a plurality of processor cores and for managing a database, comprising:
    a query reception unit being configured to receive a query to the database;
    a query execution plan generation unit being configured to generate a query execution plan including information representing a processing step necessary for executing the received query and an execution procedure of the processing step; and
    a query execution unit being configured to execute the received query based on the generated query execution plan, and in executing the received query, dynamically generate a task for executing the processing step and execute the dynamically generated task,
    wherein the query execution plan generation unit is configured to execute a context sharing determination processing based on execution state information of the generated task, the execution state information of the generated task including information related to acquired data that is necessary for generating a result for the generated task, to determine whether a context relating to the processing step is to be shared between a plurality of threads or to be not shared between the plurality of threads, and
    wherein the query execution unit is configured to:
        generate the context including the execution state information of the generated task in the execution of the received query,
        manage the generated context by associating the generated context with a generated task assigned thread, based on a result of the determination,
        assign the plurality of threads to the plurality of processor cores in the execution of the received query, and
        in each of the plurality of threads, execute one or more tasks assigned to the thread, respectively, based on the context associated with the thread.

2. The database management system according to claim 1, wherein the query execution plan generation unit is further configured to determine whether the context relating to the processing step is to be shared between the plurality of threads or to be not shared between the plurality of threads, based on a preceding or subsequent relation of the processing step with another processing step in the query execution plan.

3. The database management system according to claim 1, wherein a data read request is issued with asynchronous I/O with respect to the database in a task assigned to a thread executed by a processor core of the plurality of processor cores,
    wherein the processor core that executes the thread is configured to perform execution of another executable task after issuance of a data read request in the task and before reading of data corresponding to the data read request is completed, and
    wherein the processor core that executes the thread is configured to resume execution of the task after reading of data corresponding to the data read request in the task has been completed.

4. The database management system according to claim 1, wherein a number of the threads capable of being assigned with a task for executing the processing step is identical to the number of the processor cores, and processor cores that execute respective threads are each set as different processor cores.

5. The database management system according to claim 1, wherein, in a case where a plurality of processing blocks including concurrently executable processing steps are included in the query execution plan, the query execution plan generation unit is configured to determine that a context relating to a processing step at a start of the processing block is to be shared between a plurality of threads and determine that a context relating a processing step other than the processing step is to be not shared between threads.

6. The database management system according to claim 1, wherein, in a case where a plurality of processing blocks including concurrently executable processing steps are included in the query execution plan, the query execution plan generation unit is configured to determine that the context relating to a processing step with a predetermined number or greater number of subsequent processing steps in the processing block is to be shared between a plurality of threads and determine that a context relating to a processing step with a less number than a predetermined number of subsequent processing steps is to be not shared between threads.

7. The database management system according to claim 1, wherein, in a case where a number of contexts available to one thread is below a predetermined number, the query execution unit is configured to use a context available to another thread for a task assigned to the one thread.

8. The database management system according to claim 1, wherein, in a case where an execution state relating to the plurality of threads has become a predetermined state, the query execution unit is configured to change a context available to one thread to a context available to another thread so that a difference in numbers of available contexts between threads becomes smaller than a predetermined number.

9. The database management system according to claim 8,
wherein a predetermined state of an execution state of the plurality of threads is a state where a difference in the numbers of available contexts between threads has become greater than or equal to a predetermined number.

10. The database management system according to claim 1,
wherein the query execution unit is configured to determine whether or not a context is to be shared between a plurality of threads based on the execution state information of a database management system, and
wherein the query execution unit is configured to cause the context to be shared between a plurality of threads in a case where the context is determined to be shared between a plurality of threads, and cause the context to be used by one thread in a case where the context is determined to be not shared between a plurality of threads.

11. The database management system according to claim 10,
Wherein the execution state information further includes a number of existing tasks in the database management system, and
wherein the query execution unit is configured to determine that the context is to be shared by a plurality of threads in a case where the number of existing tasks is less than or equal to a predetermined number and determine that the context is not to be shared in a case where the number of existing tasks is not less than or equal to a predetermined number.

12. The database management system according to claim 11,
wherein the execution state information of the database management system is predetermined information included in a context, and
wherein the query execution unit is configured to determine that the context is to be shared by a plurality of threads in a case where a data volume of the predetermined information included in the context is less than or equal to a predetermined volume and determines that the context is not to be shared in a case where a data volume of the predetermined information included in the context is not less than or equal to a predetermined volume.

13. The database management system according to claim 1,
wherein the query execution unit is configured to cause the context to be available to any of the threads, and
wherein the query execution unit is configured to change the context available to one thread to a context available to another thread so that a difference in the numbers of available contexts between threads becomes smaller than a predetermined number in a case where a difference in numbers of available contexts between threads has become greater than or equal to a predetermined number.

14. A computer comprising:
a storage resource; and
a control device including a plurality of processor cores which is coupled to the storage resource,
the control device being configured to:
receive a query to a database,
generate a query execution plan including information representing a processing step necessary for executing the received query and an execution procedure of the processing step,
execute the received query based on the generated query execution plan, and in executing the received query, dynamically generate a task for executing a processing step and execute the dynamically generated task,
execute a context sharing determination processing based on execution state information of the generated task, the execution state information of the generated task including information related to acquired data that is necessary for generating a result for the generated task, to determine whether a context relating to the processing step is to be shared between a plurality of threads or to be not shared between the plurality of threads,
generate the context including the execution state information of the generated task in the execution of the received query,
manage the generated context by associating the generated context with a generated task assigned thread, based on a result of the determination,
assign the plurality of threads to the plurality of processor cores in the execution of the received query, and
in each of the plurality of threads, execute one or more tasks assigned to the thread, respectively, based on the context associated with the thread.

15. A database management method for managing a database, comprising the steps of:
(a) accepting a query to the database;
(b) generating a query execution plan including information representing a plurality of one or more processing steps necessary for executing the received query and an execution procedure of the one or more processing steps; and
(c) executing the received query by dynamically generating a task for executing a processing step and executing the dynamically generated task based on the generated query execution plan,
wherein in step (b), the method further comprising:
executing a context sharing determination processing based on execution state information of the generated task, the execution state information of the generated task including information related to acquired data that is necessary for generating a result for the generated task, to determine whether a context relating to the processing step is to be shared between a plurality of threads or to be not shared between the plurality of threads, and
wherein in step (c), the method further comprising:
generating the context including the execution state information of the generated task in the execution of the received query,
managing the generated context by associating the generated context with a generated task assigned thread, based on a result of the determination,
assigning the plurality of threads to a plurality of processor cores in the execution of the received query, and
in each of the plurality of threads, executing one or more tasks assigned to the thread, respectively, based on the context associated with the thread.

* * * * *